(12) United States Patent
Brakes

(10) Patent No.: US 11,312,472 B2
(45) Date of Patent: *Apr. 26, 2022

(54) WING STRUCTURE

(71) Applicant: AIRBUS OPERATIONS LIMITED, Bristol (GB)

(72) Inventor: David Brakes, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,270

(22) Filed: Dec. 10, 2019

(65) Prior Publication Data

US 2020/0108910 A1 Apr. 9, 2020

Related U.S. Application Data

(63) Continuation of application No. 15/379,911, filed on Dec. 15, 2016, now Pat. No. 10,513,326.

(30) Foreign Application Priority Data

Dec. 17, 2015 (GB) ...................... 1522327

(51) Int. Cl.
*B64C 3/26* (2006.01)
*B64C 3/20* (2006.01)
(Continued)

(52) U.S. Cl.
CPC ............. *B64C 3/26* (2013.01); *B64C 3/187* (2013.01); *B64C 3/20* (2013.01); *B64C 3/28* (2013.01);
(Continued)

(58) Field of Classification Search
CPC .. B64C 3/26; B64C 3/34; B64C 3/187; B64C 3/20; B64C 3/28; B64C 9/02; B64C 9/16;
(Continued)

(56) References Cited

U.S. PATENT DOCUMENTS

| 1,917,428 A | * | 7/1933 | Burnelli | B64C 9/28 244/214 |
| 2,427,065 A | * | 9/1947 | Nebesar | B64C 3/00 244/123.8 |

(Continued)

FOREIGN PATENT DOCUMENTS

| EP | 2 786 932 | 10/2014 |
| JP | S61169395 | 7/1986 |

(Continued)

OTHER PUBLICATIONS

Search and Examination Report cited in Great Britain patent application No. GB 1522327.4 dated Nov. 28, 2016 (11 pages).

*Primary Examiner* — Medhat Badawi
(74) *Attorney, Agent, or Firm* — Nixon & Vanderhye P.C.

(57) ABSTRACT

A section of an aircraft wing including a leading edge of the aircraft wing. A leading edge part of the section includes ribs; and a skin fixedly attached to the ribs to form a spanwise series of adjacent cells. Each cell includes an enclosed volume bounded by the skin at the leading edge and a pair of the ribs. At least one cell of the series of adjacent cells is a dry cell include a mounting point for mounting a leading edge high-lift device support apparatus in the dry cell. The skin at the leading edge provides a primary load path for carrying at least some of a spanwise primary load experienced by the section when in use on an aircraft.

19 Claims, 11 Drawing Sheets

(51) Int. Cl.
*B64C 9/22* (2006.01)
*B64C 9/02* (2006.01)
*B64C 3/28* (2006.01)
*B64F 5/10* (2017.01)
*B64C 3/18* (2006.01)
*B64C 9/16* (2006.01)
*B64C 25/00* (2006.01)
*B64D 27/26* (2006.01)
*B64D 37/00* (2006.01)

(52) U.S. Cl.
CPC .............. *B64C 9/02* (2013.01); *B64C 9/16* (2013.01); *B64C 9/22* (2013.01); *B64C 25/00* (2013.01); *B64D 27/26* (2013.01); *B64D 37/00* (2013.01); *B64F 5/10* (2017.01); *Y02T 50/40* (2013.01)

(58) Field of Classification Search
CPC ........... B64C 9/22; B64C 25/00; B64D 27/26; B64D 37/00; B64F 5/10; Y02T 50/40
See application file for complete search history.

(56) References Cited

U.S. PATENT DOCUMENTS

| | | | | |
|---|---|---|---|---|
| 2,427,853 | A * | 9/1947 | Goodlett | B64C 3/00 244/123.2 |
| 3,400,904 | A * | 9/1968 | Bede | B64C 3/26 244/124 |
| 4,095,760 | A * | 6/1978 | Sommer | B64C 3/26 156/85 |
| 4,471,928 | A * | 9/1984 | Cole | B64C 9/00 244/215 |
| 4,481,703 | A * | 11/1984 | Scott | B64C 3/187 244/123.1 |
| 4,739,954 | A * | 4/1988 | Hamilton | B64C 3/26 244/123.1 |
| 4,753,402 | A * | 6/1988 | Cole | B64C 9/22 244/210 |
| 4,828,202 | A * | 5/1989 | Jacobs | B64C 1/06 244/117 R |
| 5,725,709 | A * | 3/1998 | Jensen | B64D 33/02 156/169 |
| 5,779,092 | A * | 7/1998 | Hehn | B60P 3/224 137/574 |
| 6,149,105 | A * | 11/2000 | Jaggard | B64C 9/28 244/214 |
| 6,375,120 | B1 * | 4/2002 | Wolnek | B32B 5/28 244/119 |
| 6,889,937 | B2 | 5/2005 | Simpson et al. | |
| 7,195,203 | B2 * | 3/2007 | Livingstone | B64C 3/26 244/124 |
| 7,967,248 | B2 * | 6/2011 | Halme | B64C 3/187 244/117 R |
| 8,660,712 | B2 * | 2/2014 | Grabowsky | B64F 5/10 701/3 |
| 8,678,324 | B2 * | 3/2014 | Hemmelgarn | B64C 3/48 244/219 |
| 8,703,268 | B2 * | 4/2014 | Henry | B29D 99/0014 428/116 |
| 9,145,203 | B2 | 9/2015 | Campbell, Jr. et al. | |
| 9,341,207 | B2 * | 5/2016 | Grieco | F16B 5/126 |
| 9,352,822 | B2 * | 5/2016 | Nordman | B29C 66/1282 |
| 9,469,391 | B1 * | 10/2016 | Dong | B64C 23/076 |
| 9,545,992 | B2 * | 1/2017 | Guering | B64C 9/06 |
| 9,669,919 | B2 * | 6/2017 | Garcia | B29C 70/443 |
| 9,981,735 | B2 * | 5/2018 | Reusch | B64C 9/02 |
| 10,513,326 | B2 * | 12/2019 | Brakes | B64C 3/26 |
| 11,124,285 | B2 * | 9/2021 | Trouve | B64C 3/20 |
| 11,161,592 | B2 * | 11/2021 | Decker | B64C 3/18 |
| 2003/0192990 | A1 * | 10/2003 | Simpson | B29C 37/0064 244/123.7 |
| 2004/0129836 | A1 * | 7/2004 | Seidel | B64D 27/02 244/120 |
| 2007/0102587 | A1 * | 5/2007 | Jones | B64C 9/22 244/214 |
| 2009/0127402 | A1 * | 5/2009 | Jaggard | B64C 9/24 244/213 |
| 2011/0168849 | A1 * | 7/2011 | Parker | B64C 9/02 244/214 |
| 2013/0277372 | A1 * | 10/2013 | Waku | B64D 45/02 220/562 |
| 2014/0103160 | A1 * | 4/2014 | Jareno Diz Lois | B64D 45/02 244/1 A |
| 2014/0117166 | A1 * | 5/2014 | Campbell, Jr. | B64C 23/069 244/199.4 |
| 2015/0028160 | A1 * | 1/2015 | Roncz | B64C 23/069 244/199.4 |
| 2015/0053818 | A1 * | 2/2015 | Charles | B64C 3/187 244/124 |
| 2015/0203187 | A1 * | 7/2015 | Johnson | B64C 3/185 244/123.7 |
| 2015/0299837 | A1 * | 10/2015 | Ehrstrom | C22C 21/18 428/600 |
| 2016/0257427 | A1 * | 9/2016 | Humfeld | B29C 35/0266 |
| 2016/0375631 | A1 * | 12/2016 | Encinosa | B29D 99/0014 156/91 |
| 2017/0174313 | A1 * | 6/2017 | Brakes | B64C 3/28 |
| 2017/0225766 | A1 * | 8/2017 | Carlson | B64C 3/26 |
| 2020/0108910 | A1 * | 4/2020 | Brakes | B64C 3/20 |

FOREIGN PATENT DOCUMENTS

| | | |
|---|---|---|
| WO | 02/074469 | 9/2002 |
| WO | 2011/011089 | 1/2011 |

* cited by examiner

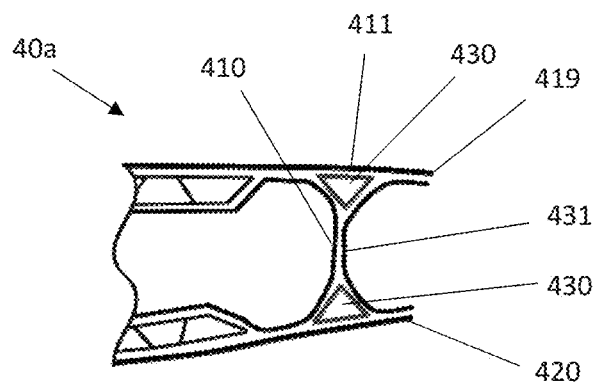
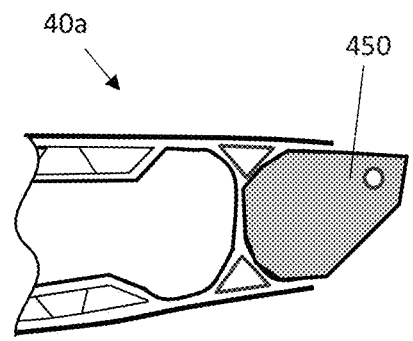
Figure 5a
Figure 5b
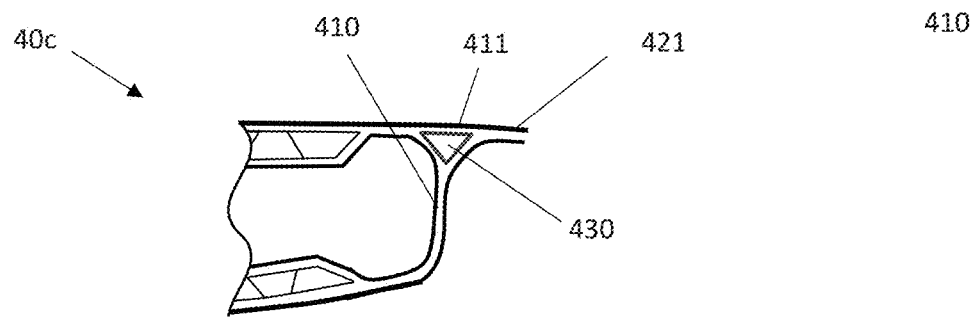
Figure 5c
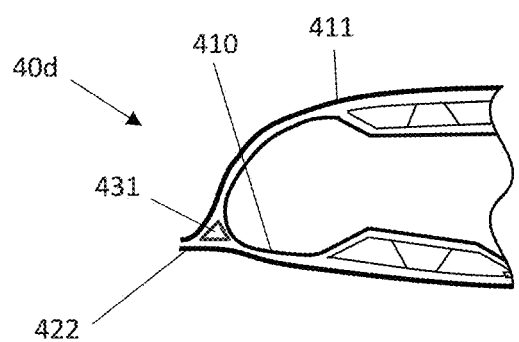
Figure 5d

WING STRUCTURE

RELATED APPLICATION

This application is a continuation of U.S. patent application Ser. No. 15/379,911, filed Dec. 15, 2016, which claims priority to Great Britain patent application 1522327.4 filed Dec. 17, 2015, these applications are incorporated by reference in their entireties.

TECHNICAL FIELD

The present invention relates to a wing section for an aircraft wing and to a method of manufacturing a wing section for an aircraft wing.

BACKGROUND

Traditional metal aircraft wings comprise a segmented box structure (wingbox) formed from C-beams (spars), ribs, and stiffened skin panels (covers). Further fixed structures are provided beyond the leading and trailing edges of the wingbox to create an aerodynamic profile and to support moveable lift devices such as slats (leading edge) and flaps (trailing edge). Composite wings are generally structured in a similar manner, with spars, ribs and leading and trailing edge fixed structures. Such use of composite materials in metallic-derived architectures is often known as "black aluminium" design.

FIG. 1 is an internal view of a section 1 of a composite wing structured according to the "black aluminium" design approach. The wing section 1 comprises a wingbox formed by a front spar 2, a rear spar 3, an upper cover panel 4, and a lower cover panel 5. A fixed leading edge structure 6 is fixedly attached to the front spar 2 and to the front cover overhangs (i.e. the parts of the upper cover panel 4 and the lower cover panel 5 which extend forward of the front spar 2). The fixed leading edge structure houses structure and mechanisms associated with leading edge high-lift devices, but it is not itself intended to carry any of the spanwise primary loads (e.g. wing bending loads) experienced during operation of the wing section on an aircraft. Instead, substantially all of the primary loads are transmitted to the wingbox via the fixed attachment to the front spar 2. A similar trailing edge structure (not shown) will typically be attached to the rear spar 3. The locations of fasteners are indicated by black dots. The spars 2, 3 and cover panels 4, 5 comprise portions of composite material. It will be appreciated from FIG. 1 that a significant number of fasteners must be provided through the composite material of the spars and cover panels to form the wingbox.

SUMMARY

A first aspect of the present invention provides a section of an aircraft wing. The section includes a leading edge of the aircraft wing. A leading edge part of the section comprises a plurality of ribs; and a skin fixedly attached to the plurality of ribs to form a spanwise series of adjacent cells. Each cell comprises an enclosed volume bounded by the skin at the leading edge and a pair of the ribs. At least one cell of the series of adjacent cells is a dry cell comprising a mounting point for mounting a leading edge high-lift device support apparatus in the dry cell. The skin at the leading edge provides a primary load path for carrying at least some of a spanwise primary load experienced by the section when in use on an aircraft.

The term "primary load path", as used herein, is intended to refer to a component or set of components which functions to carry a primary load from the point of load application to a structure that reacts the load. In the context of an aircraft wing, a primary load is a load that is normally experienced by the wing during flight. The most significant primary loads on an aircraft wing act in the spanwise direction, and include compression, tension and shear forces resulting from wing bending. Such loads are hereinafter referred to as "spanwise primary loads". In a conventional aircraft wing, substantially all of the spanwise primary shear loads are carried by the spars.

Embodiments of the invention therefore provide a wing structure which can be formed from a composite material, with few or no features which locally weaken the composite material. As such, significant improvements in performance, weight and cost can be achieved as compared with a "black aluminium" composite wing structure. In particular, strain allowables on a conventional composite wing structure are limited by bolt holes; free edge impact; and corner unfolding issues (through-thickness tension failure). Embodiments of the invention can eliminate the sources of some or all of these strain limitations. As a result, the composite material can be made to work much harder, saving structural weight. Further weight reductions can be achieved through the elimination of bolted joints, i.e. by both eliminating the weight of the bolts themselves, and eliminating the local reinforcement required for the bolt holes.

Optionally, the skin forms the leading edge of the aircraft wing, an upper surface of the aircraft wing, and a lower surface of the aircraft wing. In some examples the skin may further form a trailing edge of the aircraft wing.

Optionally, the mounting point is configured to transmit a force from the leading edge high-lift device support apparatus to the skin via at least one of the ribs defining the dry cell.

Optionally, the wing section further comprises a wet conduit for transporting fuel from one part of the wing section to another part of the wing section, a wet cell of the series of adjacent cells being in fluid communication with the wet conduit. In some examples the wet conduit may comprise an integral feature of the skin.

Optionally, the series of adjacent cells comprises a plurality of dry cells. In some examples the series of adjacent cells may comprise a plurality of wet cells.

Optionally, the wing section further comprises a dry conduit for connecting one part of the wing section to another part of the wing section, the dry conduit having an opening into the or each dry cell.

Optionally, the dry cell comprises at least one further mounting point. The at least one further mounting point may be for mounting, in the dry cell, one or more of: a leading edge high-lift device support apparatus; a trailing edge high-lift support apparatus; an engine pylon support apparatus; a wing section-tip device support apparatus; and a landing gear support apparatus. The at least one further mounting point may be configured to transmit a force from an apparatus mounted on the further mounting point to the skin via at least one of the ribs defining the dry cell.

Optionally, the trailing edge comprises the series of adjacent cells (i.e. in examples where each adjacent cell of the series extends from the leading edge to the trailing edge). In such examples a dry cell of the series of adjacent cells may comprise a further mounting point for mounting a trailing edge high-lift device support apparatus in the dry cell. In such examples a dry cell of the series of adjacent cells may comprise a trailing edge high-lift device support opening through the skin into the dry cell. The mounting point and/or the opening may be for enabling connection of a trailing edge high-lift device support apparatus in the dry cell to a trailing edge high-lift device external to the dry cell.

Optionally, the wing section further comprises a trailing edge high-lift device, mounted on a trailing edge high-lift device support apparatus. In such examples the trailing edge high-lift device support apparatus may extend through the trailing edge high-lift device support opening. In such examples the trailing edge high-lift device support apparatus may be fixedly connected to the further mounting point. In some examples the trailing edge high-lift device comprises a flap and the trailing edge high-lift device support apparatus comprises a beam with a rack and pinion.

Optionally, the leading edge part of the section further comprises a leading edge high-lift device support opening through the skin into the dry cell, for enabling connection of a leading edge high-lift device support apparatus in the dry cell to a leading high-lift device external to the dry cell. In some such examples the wing section may further comprise a leading edge high-lift device, mounted on a leading edge high-lift device support apparatus. The high-lift device support apparatus may extend through the leading edge high-lift device support opening and be fixedly connected to the mounting point.

Optionally, the skin comprises a single portion of material which forms a loop around the plurality of ribs. The loop may be a closed loop.

A second aspect of the present invention provides an aircraft comprising a wing according to the first aspect.

A third aspect of the present invention provides a method of manufacturing a wing section for an aircraft. The method comprises providing one or more mandrels. The one or more mandrels comprises mandrel material and a plurality of rib portions. The method further comprises providing a first portion of uncured skin material on the one or more mandrels so as to create a volume bounded by the first portion of uncured skin material and a pair of the rib portions. The volume contains at least some of the mandrel material. The method further comprises curing the uncured skin material. The method further comprises removing the mandrel material from the volume.

Optionally, the method further comprises, before curing the first portion of uncured skin material, providing reinforcing structures on the first portion of uncured skin material. In some examples the method may further comprise, before curing the first portion of uncured skin material, providing an external feature and/or an external feature supporting structure on the first portion of uncured skin material. In some examples the method may further comprise, before curing the first portion of uncured skin material, providing a second portion of uncured skin material on the first portion of uncured skin material.

Optionally, the method further comprises, after the step of removing the mandrel material, providing the wing section with one or more additional features. In some examples the one or more additional features comprises one or more of: an opening into a duct stringer from a wet cell; an opening into a duct stringer from a dry cell; an opening into a dry cell for a high-lift device mechanism; a manhole, support structure for a high-lift device; support structure for an engine pylon; support structure for a flight-control device; support structure for an external range extension fuel tank; support structure for landing gear; fuselage attachment structure.

Optionally, the method may be performed such that the wing section is a wing section according to the first aspect.

BRIEF DESCRIPTION OF THE DRAWINGS

Embodiments will now be described, by way of example only, with reference to the accompanying drawings, in which:

FIG. 2b is a plan view of the wing section of FIG. 2a;

FIG. 3b is a schematic view of a the wing section of FIG. 3a;

FIGS. 3c and 3d are schematic views of dry cell intermediate structure of the wing section of FIG. 3a;

FIGS. 5a, 5b and 5c each show a different example trailing edge profiles for use on a wing section according to the embodiments;

FIG. 5d shows an example leading edge profile for use on a wing section according to the embodiments;

Figure 3A:
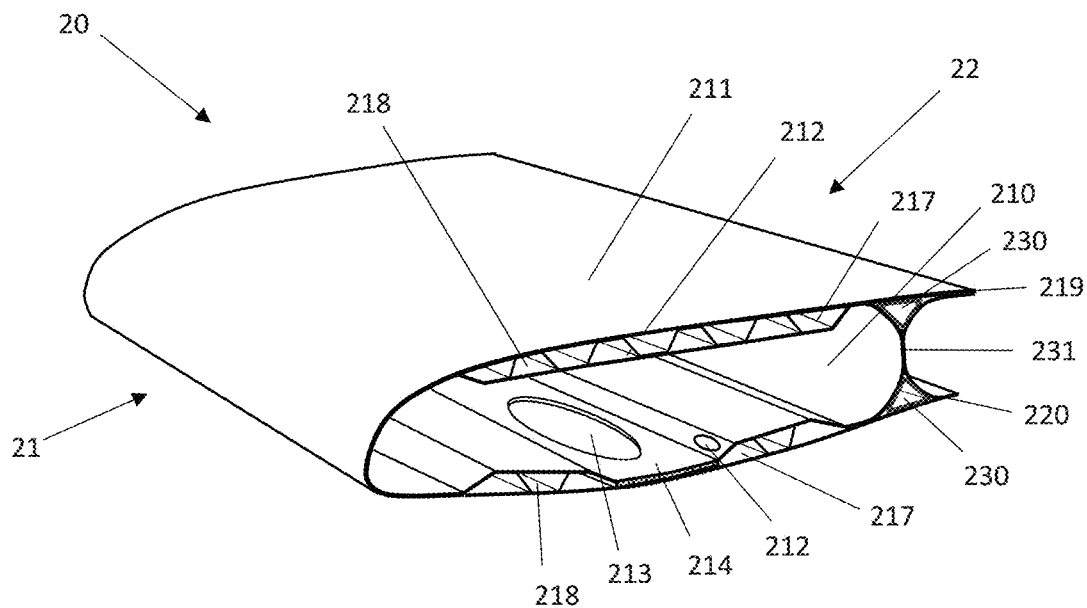
FIG. 3a is a schematic view of a part of a wing section according to a second embodiment.
Figure 3B:
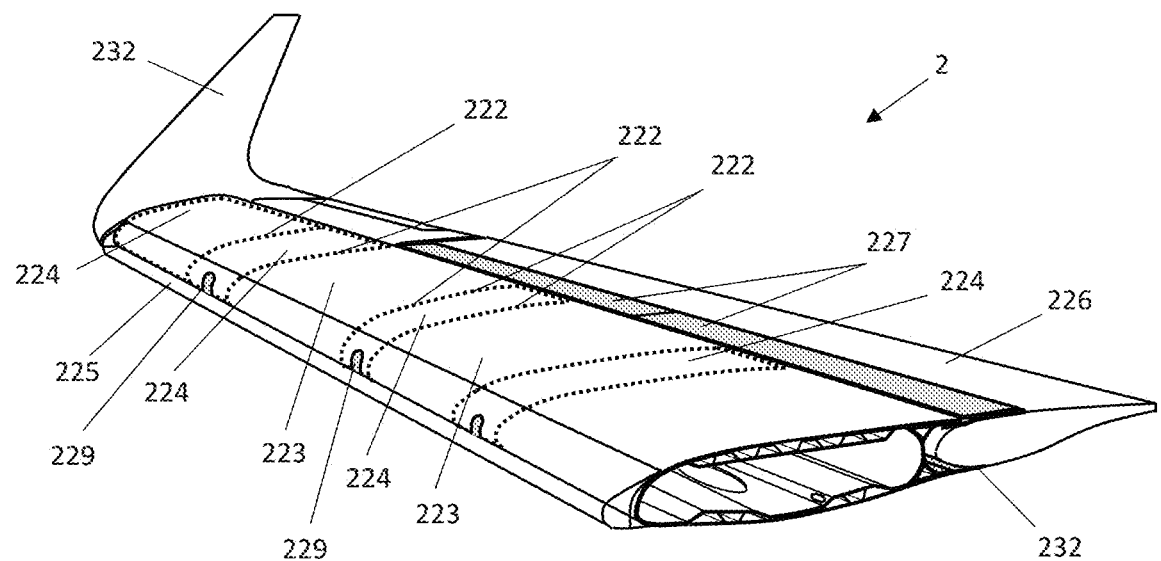

Each of FIGS. 6a, 6b, 6c and 6d is a cross-section through the wing section of FIG. 3b, respectively in a cruise configuration, a take-off configuration, a landing configuration, and a deceleration configuration.

Each of FIGS. 7a, 7b, 7c and 7d is a schematic view of a wing section according to a third embodiment, respectively in a cruise configuration, a take-off configuration, a landing configuration, and a deceleration configuration.

Figure 8A:
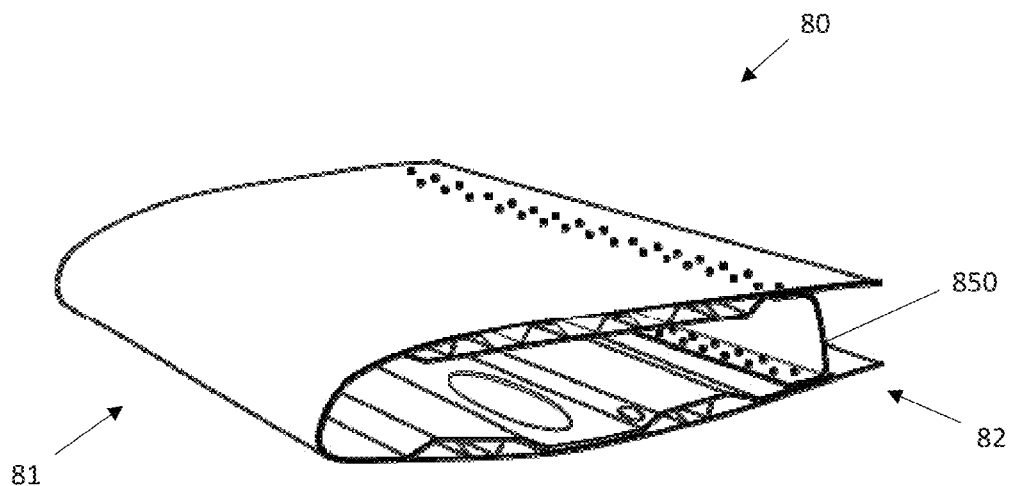
Figure 8B:
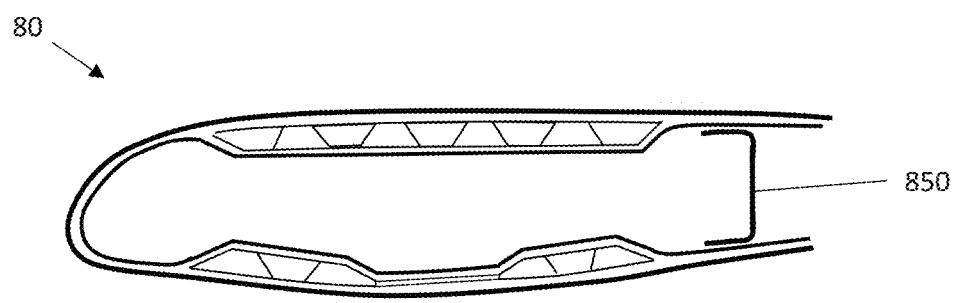
Figure 9:
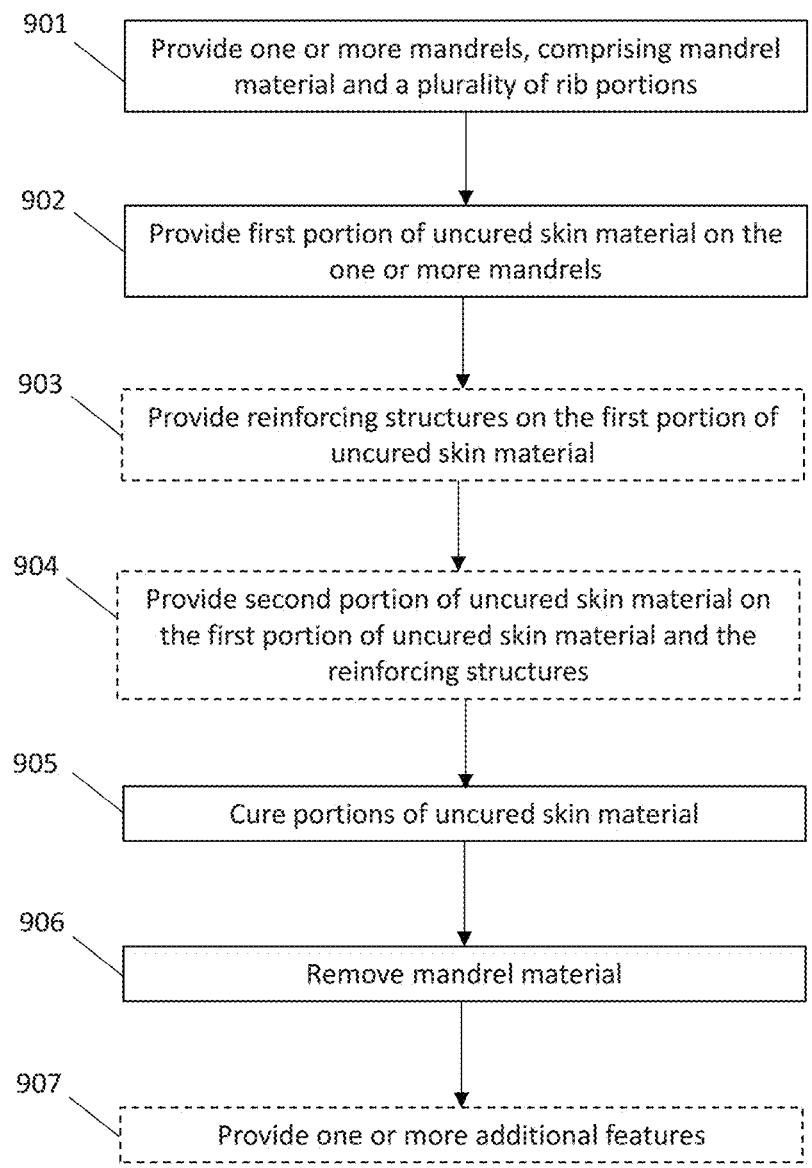
Figure 10:
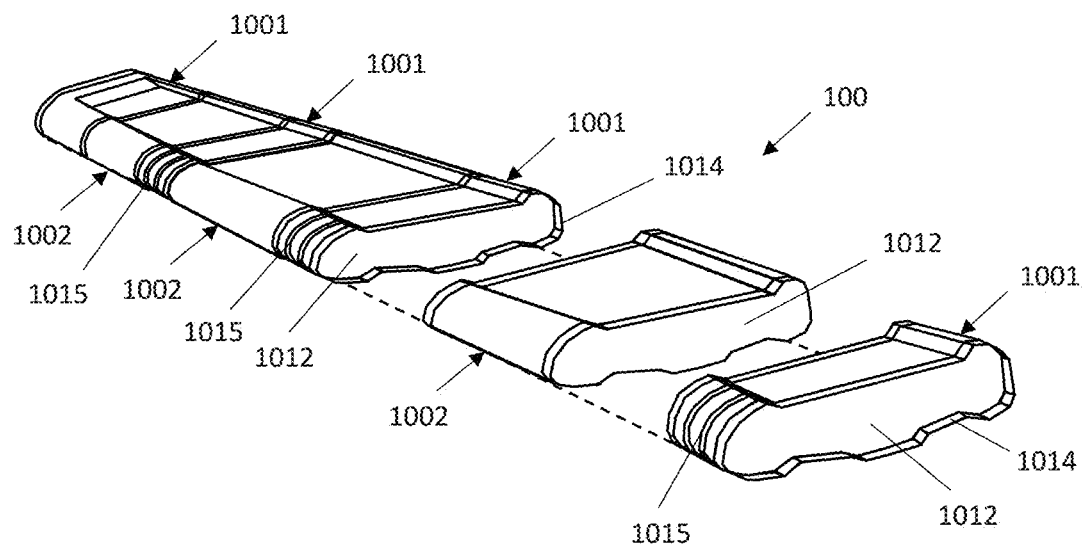
Figure 11:
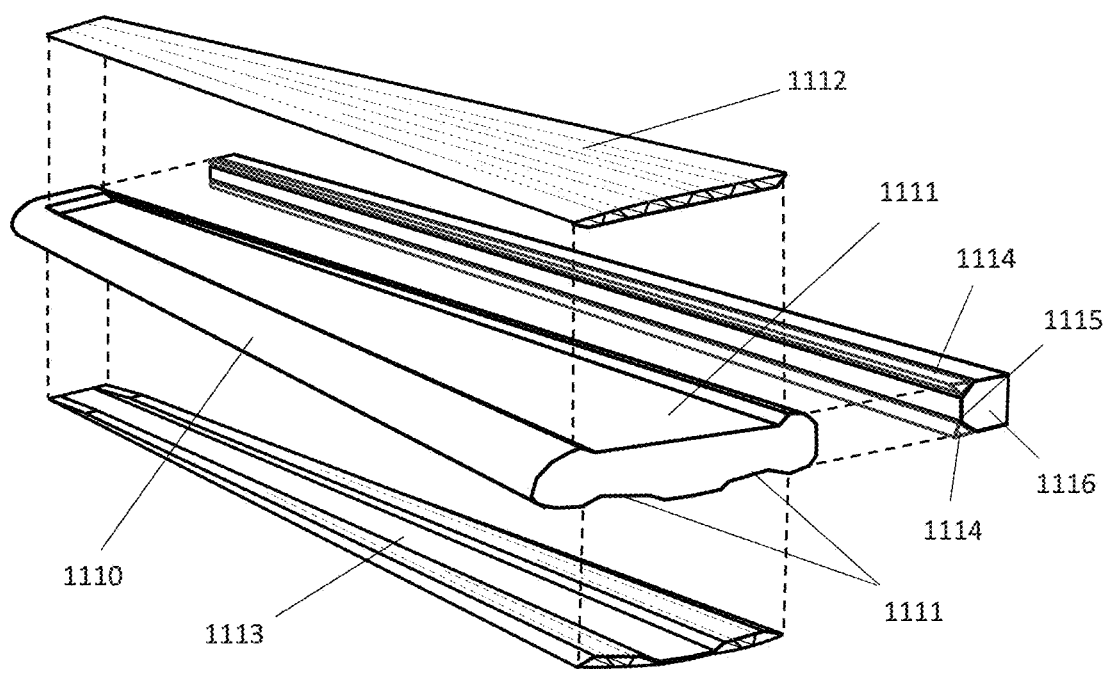
Figure 12:
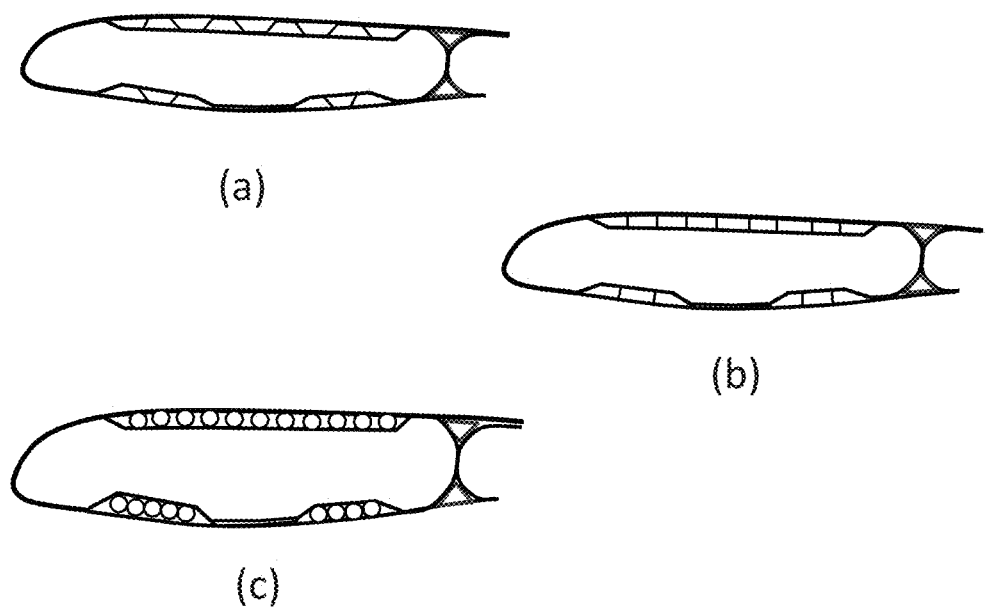
Figure 13:
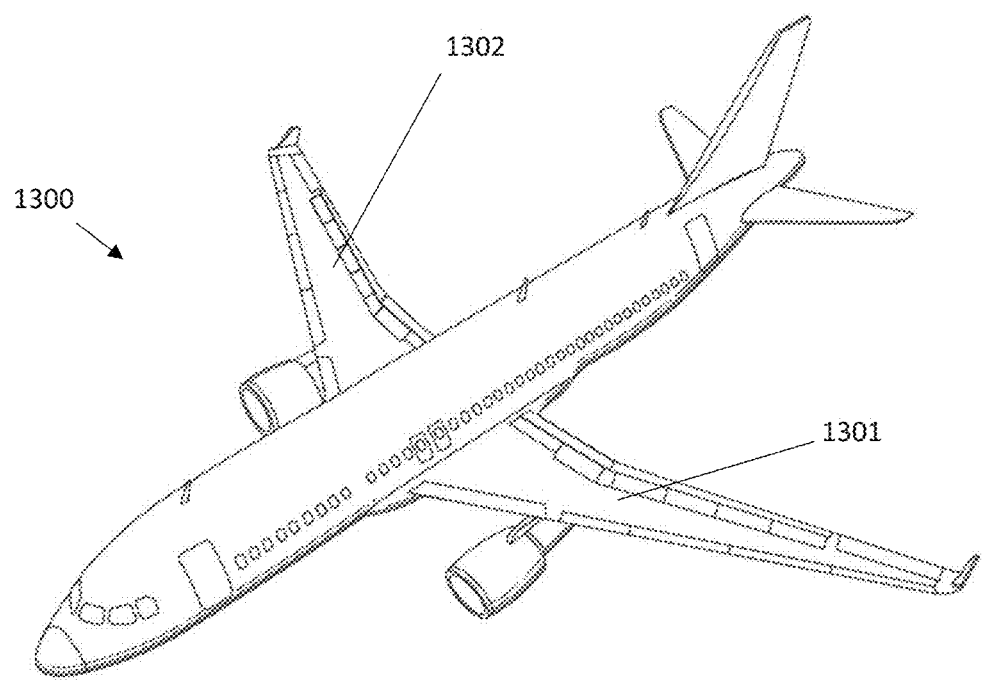

FIG. 8a is a schematic view of part of a wing section according to a fourth embodiment;

FIG. 8b is a cross-section through the wing section of FIG. 8a;

FIG. 9 is a flow chart of an example method for manufacturing a wing section according to the embodiments;

FIG. 10 is an exploded view of an example complete mandrel produced as part of the method of FIG. 9;

FIG. 11 is an exploded view of an example assembly produced as part of the method of FIG. 9;

FIG. 12 shows cross-sections through three wing sections according to the embodiments, each having a different duct stringer arrangement; and FIG. 13 is a schematic view of an example aircraft comprising a wing section according to the embodiments.

DETAILED DESCRIPTION

The invention relates to a structure for a composite aircraft wing section and to a method of manufacturing a composite aircraft wing section having the structure.

The inventors have appreciated that the "black aluminium" design approach may prevent the potential performance benefits of composite materials from being fully realised. For example, the sharp corners and fasteners required to fabricate a wingbox structure (e.g. as exemplified by the wing section 1 of FIG. 1) can reduce the local strength of a composite material, requiring the composite material to be reinforced. Such reinforcement adds cost and weight. Embodiments of the invention seek to provide structure for at least a section of a composite wing which reduces or eliminates features which locally weaken the composite material.

Figure 2A:
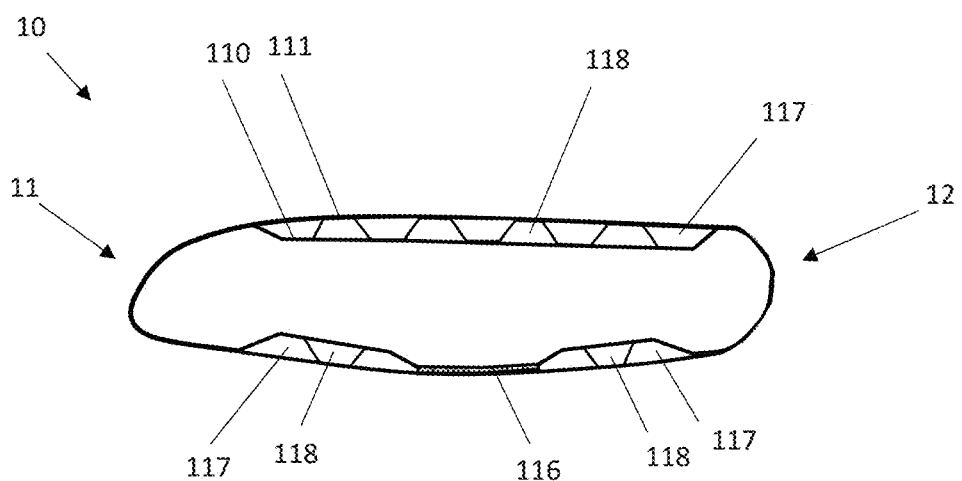
FIG. 2a is a cross-section through a wing section according to a first embodiment.
Figure 2B:
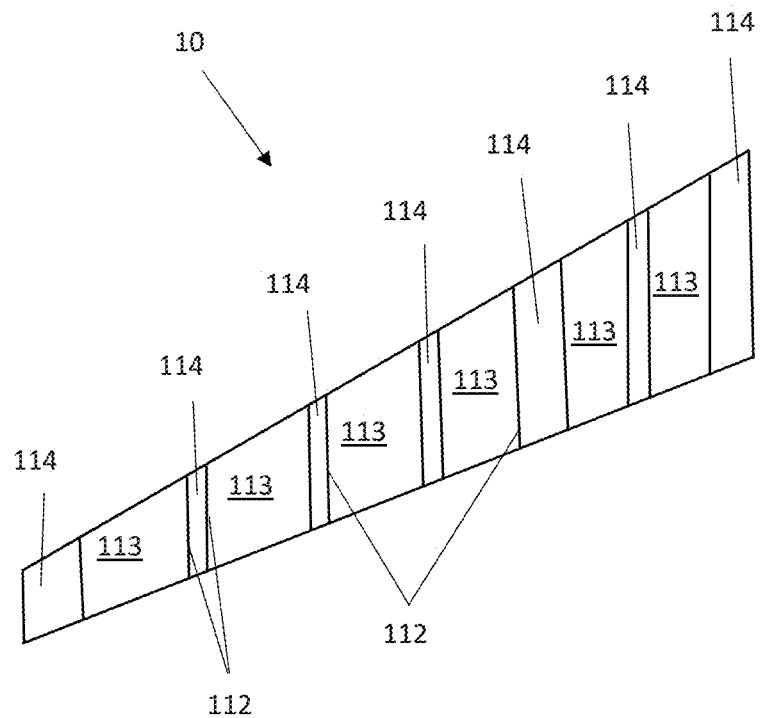

FIG. 2a shows a cross-section through a section 10 of an aircraft wing, according to a first embodiment. FIG. 2b is a plan view of the wing section 10 of FIG. 2a. The wing section 10 may comprise an entire wing. Alternatively, the wing section 10 may comprise a part of an aircraft wing having a spanwise length less than the spanwise length of the entire wing. For example, the wing section 10 may comprise one, both or neither of a wing root (i.e. the end of the wing which attaches to a fuselage) and a wing tip. The wing section 10 has a leading edge 11 and a trailing edge 12. Where the wing section 10 does not comprise an entire wing, the leading edge 11 comprises part of the leading edge of the wing of which wing section 10 is a part, and the trailing edge 12 comprises part of the trailing edge of the wing of which wing section 10 is a part.

The wing section 10 comprises a skin wrapped around an aerodynamic profile. The wing section 10 therefore comprises a monocoque beam. The skin is formed from a composite material and comprises an inner skin 110, which forms an Inner Mould Line (IML), and an outer skin 111, which forms an Outer Mould Line (OML). The inner skin 110 forms a continuous circumferential inner boundary (except where discrete cut-outs such as manholes are provided), which has no breaks or joints once cured. The outer skin 111 forms the aerodynamic profile of the wing section from the leading edge 11 to the trailing edge 12. In some examples one or both of the inner and outer skins comprises a continuous loop (i.e. around the wing profile) of composite material. However, it is also possible to form one or both of the inner and outer skins from one or more sheets of composite material having spanwise edges joined by fasteners at the trailing edge of the wing section.

Vertical shear forces are carried in the skin as shear flows around the leading and trailing edges of the wing. At least the skin at the leading edge provides a primary load path for carrying at least some of a spanwise primary load experienced by the wing section 10 when in use on an aircraft. Indeed, in the particular example the skin carries all of the primary loading (bending, torsion and vertical shear) experienced by the wing section 10 when it is in use on an aircraft. The skin therefore performs the primary function of the spars of a conventional "black aluminium" type wing structure. As such, the wing section 10 does not need to include any spars.

Structural reinforcement can be provided to the wing section 10, if required for a given application, by providing a reinforcing structure or material sandwiched between the inner skin 110 and the outer skin 111, in one or more regions. In some examples the reinforced regions are located near the centre of the wing section in the streamwise direction (e.g. because the skin at the leading and trailing edge is inherently stable due to the large curvature in these areas, and therefore will not generally need additional spanwise support). In the illustrated example, the reinforcing structure comprises a plurality of duct stringers 118, 117 (218, 217 in FIG. 3a) sandwiched between the inner and outer skins at the central upper part of the wing section 10. Additionally, at the central lower part of the wing section 10, duct stringers 117, 118 (218, 217 in FIG. 3a) and structural foam 116, are sandwiched between the inner and outer skins.

The provision of structural foam 116 in the central lower region of the wing skin reinforces this region sufficiently that manholes can be provided in this region. It is also possible to use other types of reinforcing materials alternatively or additionally to structural foam, or to omit the foam entirely. For example, one or both of the central upper part of the wing section and the central lower part of the wing section could be reinforced with a core made from foam, honeycomb, chopped or continuous fibre CFRP or GFRP (glass fibre reinforced polymer) matting, EPDM rubber etc. Equally a CFRP fabric could be used to create a thick section of monolithic CFRP once cured to the skin. The skin of the wing section 10 thereby comprises regions of sandwich structure between regions of monolithic structure (where the inner skin 110 and outer skin 111 coalesce to form a single skin).

A "stringer", as found on a conventional aircraft wing, is an open-section beam attached to the IML of a wing skin to provide out-of-plane stiffness (carrying aerodynamic pressure loads to the ribs) and compressive stability (preventing the skin from buckling), as well as to support the spanwise wing bending loads. The duct stringers 118, 117 provide the same structural function as conventional stringers. However; by virtue of having a closed section structure, they additionally provide a sealed conduit through which air, fuel or fuel vapour may pass, or through which, e.g. hydraulic, mechanical, electrical or optical power and/or signalling infrastructure can be routed.

A plurality of duct stringers can be abutted to one-another to form a monolithic stiffened core, or "duct stringer panel". When co-cured or co-bonded to the IML and OML skins, this core then functions in the same way as a foam or honeycomb core in a conventional sandwich panel. Alternatively, one or more duct stringers can be embedded in a core material, such as structural foam, to produce a hybrid core. Various different arrangements and section shapes of duct stringers are possible. FIG. 12 shows cross-sections of three wing sections, each of which comprises a different duct stringer arrangement. The arrangement in (a) comprises panels of multiple adjacent trapezoidal-section duct-stringers. This type of arrangement of trapezoidal-section duct stringers type has the advantage that it can be produced using a corrugation of composite material. The arrangement in (b) comprises panels of multiple adjacent square-section duct stringers. This type of arrangement of square-section duct stringers facilitates the use of duct stringers which do not extend along the whole spanwise length of the wing. The arrangement in (c) comprises multiple round-section duct-stringers embedded in a core material. Round-section duct stringers are advantageously able to withstand large internal pressures. A plurality of different duct stringer arrangements may be used in a single wing or wing section.

Duct stringers can run along substantially the whole spanwise length of a. However; if a wing is significantly tapered along its length, it can be desirable for the number of duct stringers to reduce when moving outboard along the wing (otherwise, it could be the case that the section area of some or all of the duct stringers becomes excessively small). Where multiple duct stringers are provided as a duct stringer panel sandwiched between the IML and OML skins, the foremost and aftmost duct stringers may run along substantially the whole spanwise length of the wing or wing section, whilst one or more duct stringers between the foremost and aftmost duct stringers (referred to hereinafter as "internal duct stringers") do not run along the whole spanwise length of the wing or wing section. This can be achieved by successively merging adjacent pairs of internal duct stringers. In some examples the internal duct stringers may coalesce into a single duct at the wing tip. Such an arrangement can be created, for example, by arranging I-section beams of various lengths adjacent to one-another between the inner and outer skins during manufacturing of the wing. A pre-form duct stringer panel having this arrangement can be created by providing a covering skin around the arrangement of I-section beams, the panel as a whole would then be sandwiched between the inner and outer wing skins during manufacturing of the wing/wing section.

In the illustrated example, the duct stringers 118, 117 have a trapezoidal cross-section and run along substantially the whole spanwise length of the wing section 10. The sections of skin comprising the duct stringers are relatively stiff by virtue of having two offset skins (i.e. the inner skin and the outer skin) which have a vertical shear path between them, and they therefore provide spanwise structural support to the skin. Further stiffness can be provided by the inclusion of foam cores (or another type of reinforcing material) alongside the duct stringers, as exemplified by the central lower part of the wing section 10. However; it is envisaged that in some embodiments (e.g. embodiments in which a large number of duct stringers is used), sufficient stiffness is provided by the duct stringers so that it is not necessary to include any foam cores in the skin.

The profile shape of the wing section 10 is maintained by a plurality of ribs 112. Each rib 112 is attached to the skin around its perimeter (e.g. by curing or bonding), so that the ribs form a plurality of airtight baffles within the wing section structure. The internal space within the wing section 10 is thereby segmented into a series of discrete cells 113, 114 along the spanwise length of the wing section 10. Wing sections according to the embodiments may therefore be described as having a "cellular" structure. In this example the ribs 112 are formed from carbon fibre reinforced polymer (CFRP), and are co-cured to the inner skin 110 during manufacture of the wing section 10. This construction provides an effective path for transmitting shear forces from the ribs 112 to the skin, as well as creating an impermeable barrier between adjacent cells. The ribs 112 can be oriented either chordwise or streamwise, depending on the particular application (e.g. depending on the requirements of any high-lift devices mounted to the ribs).

In the example of FIG. 2b, some of the ribs 112 are arranged in closely spaced pairs, producing alternating narrow cells 114 and wide cells 113. The narrow cells 114 may be considered to be "dry cells" because they do not contain any fuel. The wide cells 113 may be considered to be "wet cells" because they are intended to be filled with fuel during operation of an aircraft comprising the wing section 10. In the illustrated example, a larger dry cell is provided at the extreme outermost end of the wing section 10. This wing tip dry bay could, for example, house structure for mounting a wing tip device.

For the sake of simplicity, the wing section 10 does not include any high-lift devices (e.g. flaps, slats, etc.). However; it is envisaged that typically the dry cells 114 will house mechanisms and systems required to drive high lift devices. Structure for the attachment of engine pylons to the wing section 10 and for the attachment of the wing section 10 to the fuselage of an aircraft can also be housed in one or more of the dry cells 114, as can any pumps etc. for moving fuel from one location to another (e.g. from a wet cell 113 to an engine).

Conventional spars, as well as carrying the vertical shear loads between the upper and lower cover panels, also help to react vertical loads that arise between the cover panels, e.g. due to the brazier effect, or fuel over pressure. The brazier effect is a tendency for the upper and lower cover panels to move towards each other as the wing bending curvature increases. Any structure between them (such as spars or ribs) resists this tendency, thereby reacting the resulting crushing loads (known as brazier loads). Fuel over-pressure, on the other hand, pushes the cover panels apart, creating tensile reaction loads in the spars and ribs. To improve the ability of a cellular wing structure as described above to resist vertical loads of these types, the spacing (pitch) between the ribs 112 can be made relatively small (e.g. as compared to the typical rib spacing used for a conventional wing structure). Alternatively, intermediate ribs, intercostals (spanwise structural elements which join two adjacent ribs together), and/or vertical ties (e.g. rods which pin an upper point of the inner skin to a lower point of the inner skin) can be included in one or more of the dry cells 114 and/or wet cells 113. Intermediate ribs can, but need not, extend the full vertical height of the cell in which they are provided.

At least some of the ribs 112 include integral features (not shown) on the sides which face into the dry cells 114, onto which mechanisms and structures housed by the dry cells can be mounted. These features represent the major points at which loads associated with these mechanisms/structures are transmitted to the wing structure. Providing such features on the ribs 112 avoids the need for fastener holes to be created in the skin 11. Advantageously, reducing or eliminating fastener holes improves the structural integrity of the composite material of the skin because such holes create local weaknesses. Lightning strike behaviour is also improved by eliminating the use of fasteners in fuel containing spaces. The integral features may comprise intermediate structure provided between the ribs, and/or mounting points for such intermediate structure. Intermediate structure can be metallic, cured or part-cured CFRP, or any combination of these. A given intermediate structural feature can be full-height (in which case it may be co-bonded to the upper and lower IML surfaces) or part height (i.e. such that it does not extend for the full vertical height of the cell in which it is provided).

The rib closest to the root of the wing section 10 (i.e. the rib which bounds the innermost cell, not shown in FIG. 3b, hereinafter referred to as the "root rib") is reinforced (e.g. in any suitable manner known in the art) to facilitate attachment of the wing section 10 to an aircraft fuselage. The attachment can be to a centre box of the aircraft, using techniques the same as or similar to those used to attach a conventional wing to a fuselage. Alternatively, a section of wing having a conventional (e.g. black aluminium type) structure can be provided between the fuselage and the wing section 10. In such examples, the root rib is attached to the end of the conventional wing section, using any suitable technique known in the art. Advantageously, this enables the engine pylons to be fixed to the conventional wing section, removing the need to provide heavily reinforced dry cells to support the engine pylons.

The duct stringers 118 connect the dry cells 114, by means of one or more openings (not visible) into the duct stringers 118 from the interior of each dry cell 114. The duct stringers 118 (hereinafter referred to as "dry conduits") thereby form conduits through which electrical, hydraulic and/or mechanical power and signalling infrastructure (e.g. for high lift devices and/or control surfaces) can be routed. Similarly, the duct stringers 117 connect the wet cells 113, by means of one or more openings 212 into the duct stringers 117 from the interior of each wet cell 113. The duct stringers 117 (hereinafter referred to as "wet conduits") thereby form conduits through which fuel and fuel vapour can move from one part of the wing section 10 to another (e.g. by pumping or draining). The dry conduits 118 only have openings into the dry cells 114, and the wet conduits 117 only have openings into the wet cells 113, such that the wet cells and the dry cells are kept fully segregated. Providing a plurality of separate, but interconnected, wet bays advantageously permits fuel to be moved to other bays, in the event that one of the bays is ruptured (e.g. by a bird strike). Furthermore, one or more of the wet conduits 117 could comprise part of an inerting system, e.g. to carry fire retardant foam to the wet cells 113.

FIG. 3a shows an internal view of a part of an aircraft wing section 20, according to a second embodiment. FIG. 3b shows a larger part of the aircraft wing section 20 of FIG. 3a. The wing section 20 has a leading edge 21 and a trailing edge 22. The wing section 20 comprises a skin, formed from an inner skin 210 and an outer skin 211, wrapped around a plurality of ribs 222 (the ribs are not visible, but their locations are indicated by dashed lines in FIG. 3b) to form an aerodynamic profile.

The construction of the wing section 20 is similar to that of the wing section 10 described above in relation to FIGS. 2a and 2b. However; the wing section 20 additionally includes high-lift devices at its leading and trailing edges. These high-lift devices comprise a slat 225 (shown as transparent in FIG. 3b, so as not to obscure the leading edge 21); a flap 226; and a pair of spoilers 227. However; other embodiments are possible in which the wing section 20 comprises a different combination of high-lift devices (e.g. only a flap or flaps, only a slat, or a flap and a slat but no spoilers). Furthermore, the profile shape of the tail edge 22 of the wing section 20 differs from that of the wing section 10, in order to accommodate the flap 226, as will be discussed in further detail below.

Figure 1:
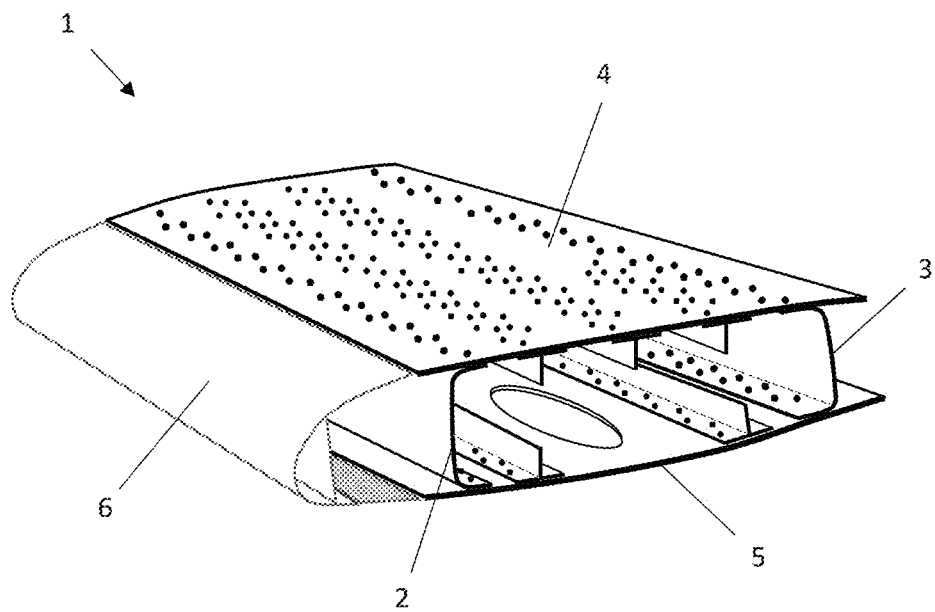
FIG. 1 is a schematic view of a prior art composite aircraft wing section.

The dry cells 224 house mechanisms and systems for mounting and driving the high-lift devices 225, 226, 227. By contrast, in a conventional "black aluminium" type wing structure the high-lift device mechanisms are housed in fixed leading and trailing edge structures and/or in flap track fairings, as illustrated by FIG. 1. As such, the wing section 20 does not include any fixed leading or trailing edge structures or any flap track fairings. Eliminating the fixed leading and trailing edge structures advantageously reduces the cost of the wing section 20 as compared to a conventional black aluminium wing structure, and can potentially increase the volume available inside the wing section for fuel storage. It also means that significantly more space within the aerodynamic profile is made available for continuous primary wing structure. As a result, wing sections according to the embodiments use material more efficiently. For example, the wing section 20 will be stiffer in bending, and will be significantly stiffer in torsion, than a "black aluminium" wing section of equivalent weight. This enables the wing section 20 to be lighter than a black aluminium wing section, for a given application. Eliminating the flap-track fairings also serves to reduce both the weight and the drag of the wing section.

The wing section 20 further comprises a wing tip device 232 (in this example, a sharklet). In the example of FIG. 3b, the two cells closest to the tip of the wing section 20 are both dry cells 224. The dry cell 224 closest to the wing tip is wider (in the spanwise direction) than any of the other dry cells 224. This wing tip dry cell houses support structure for the sharklet 232.

The wing section 20 further comprises a plurality of manholes 213 (of which only one is visible in FIGS. 3a and 3b) in the lower part of the skin (i.e. the part of the skin closest to the ground when the wing section is installed on an aircraft). The manholes 213 are positioned to correspond to the wet cells and dry cells (e.g. such that each given manhole opens into one of the wet cells 223 or one of the dry cells 224). The manholes 213 are provided in a reinforced region 214 of the lower part of the skin, which is reinforced by foam core material sandwiched between the inner skin 210 and the outer skin 211. The reinforced region 214 extends along substantially the whole spanwise length of the wing section 20. The manholes which open into the dry cells may be larger than the manholes which open into the wet cells, to facilitate access (e.g. by maintenance personnel and/or equipment) to the systems and mechanisms housed in the dry cells. The size of the manholes 213 will depend on the size of the wing; however, where possible the manholes 213 are large enough to accommodate a person's head and shoulders. The manholes 213 may be of any suitable design known in the art.

Some of the dry cells 224 additionally comprise openings 229 through the skin at the leading edge 21 of the wing section 20. The openings 229 enable linkages of the mechanisms housed in the dry cells 224 (e.g. the high-lift device mechanisms) to connect to associated leading edge high-lift devices external to the wing structure (e.g. the slat 225). The openings 229 may be reinforced, e.g. with a local skin "pad-up" (in which more plies are added to the laminate of the skin to create a locally thicker section) to minimize local weakening of the composite material of the skin. Similar openings are provided into at least some of the dry cells 224 through the skin at the trailing edge 22 of the wing section 20, e.g. to enable linkages of the mechanisms housed in the dry cells 224 to connect to trailing edge high-lift devices (e.g. the flap and the spoilers).

Figure 3C:
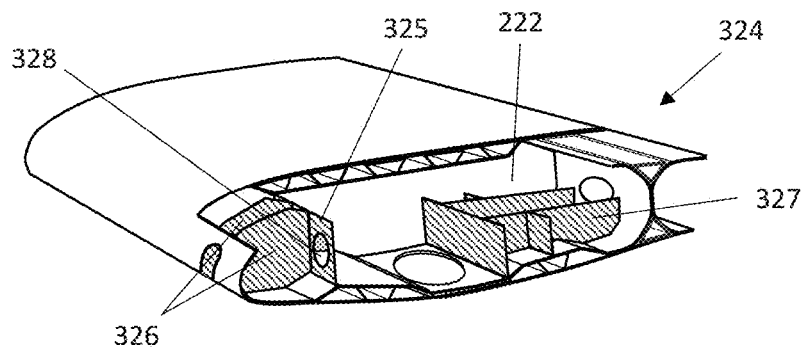
Figure 3D:
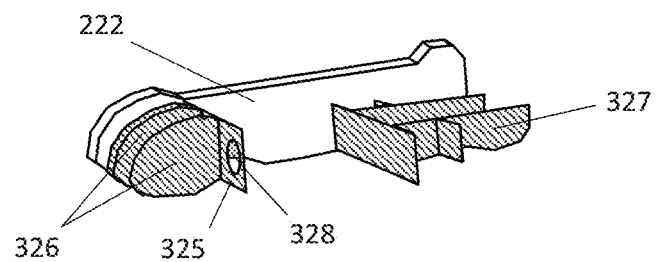

Some of the dry cells 224 comprise intermediate structure, for mounting support structures and mechanisms associated with external devices such as high-lift devices, and or to enhance the load carrying ability of the wing section 20. FIG. 3c shows a particular dry cell 324 of the dry cells 224 which includes intermediate structure, and FIG. 3d shows the intermediate structure of the dry cell 324 in isolation. The intermediate structure is shaded in FIGS. 3c and 3d, to distinguish it from the primary cellular wing structure (i.e. the ribs and the skin). In the illustrated example the intermediate structure comprises a full-height intercostal 325 which spans the width of the dry cell, to create a sub-cell at the leading edge, a pair of intermediate ribs 326 provided in the sub-cell created by the intercostal 325 at the leading edge of the dry cell 324, and a part-height support structure 327 formed from multiple interlocking part-height ribs and part-height intercostals provided at the trailing-edge of the dry cell 324.

The full-height intercostal 325 provides a mounting structure for supporting the intermediate ribs 326. The full-height intercostal 325 comprises an access hole 328, for enabling access into the sub-cell. The intermediate ribs 326 provide mounting points for a slat support mechanism (e.g. slat track rollers and pinion). The part-height support structure 327 provides mounting points for a flap support mechanism. In the particular example each of the intermediate structure elements comprises a composite material, which is co-cured to the primary cellular wing structure during manufacture of the wing section 20. However; in alternative examples the some or all of the intermediate structure can comprise a non-composite material, such as a metal. As far as is possible, all attachment of external devices/structures is achieved by mounting to intermediate structures and/or other mounting features formed integrally with the ribs 222, so that bolting through the ribs themselves is avoided.

Wing sections according to the embodiments can be shaped such that the efficiency of the high lift devices is maximized. For example, the wing section 20 includes protrusions at the trailing edge 22, in order to maintain an aerodynamic profile at the junction between the trailing edge 22 and the flap 226. The trailing-edge protrusions comprise an upper protrusion 219 and a lower protrusion 220, each of which extends rearwardly from the trailing edge 22. The trailing edge protrusions 219, 220 are each an integral part of the primary wing section structure and may therefore carry at least some of the primary loads experienced during operation of the wing section on an aircraft.

As can be seen from FIG. 3a, in this embodiment the outer skin 211 does not form a continuous tube (unlike the inner skin 210). Instead, the spanwise edges of the main portion of composite material which forms the outer skin 211 remain separate. The outer skin 211 is completed by a piece of coving skin 231 provided between the spanwise edges of the main portion, at the trailing edge 22. The coving skin 231 can be bonded or cured to the main outer skin portion 211. The coving skin 231 can be shaped to match the profile of the leading edge of the flap 226, such that the flap 226 can retract into the space between the upper and lower protrusions 219, 220, leaving little or no gap between the leading edge of the flap and the coving skin 231 when the flap is fully retracted. In FIG. 3b a fixed cover panel 232 is attached to the lower protrusion 220. The cover panel 232 extends rearwardly from the lower protrusion 220 and is shaped to seal against the lower surface of the flap 226 when the flap 226 is retracted. This prevents air from entering any gap present between the flap 226 and the lower protrusion 220 when the flap is retracted. In alternative embodiments, a flexible shroud can be provided instead of the fixed cover panel 232. A flexible shroud can, for example, be resiliently biased against the lower surface of the flap 226 and in some implementations may provide a better seal than a fixed cover panel.

The upper and lower protrusions 219, 220 are formed integrally with the skin, so that it is not necessary to introduce any fastener holes through the skin. In the illustrated example, each of the upper and lower protrusions comprises a triangular-section tube 230 provided between the inner skin 210 and the outer skin 211. The tubes 230 can comprise single units, each of which extends along substantially the whole spanwise length of the wing section 20. However; since the skins will provide continuous structure around the tubes 230, it is possible for one or more of the tubes 230 to be provided as discrete lengths of tubing, each of which extends for only part of the length of the wing 20. The tubes 230 may comprise CFRP. Alternatively, the tubes 230 may comprise metallic sections, potentially with hyperpin or proggle technology to provide a mechanical lock with adjacent composite skin sections. A join between two or more sections of skin material which is effected by means of a triangular-section tube such as the tube 230 will hereinafter be referred to as a "lambda junction".

Figure 4A:
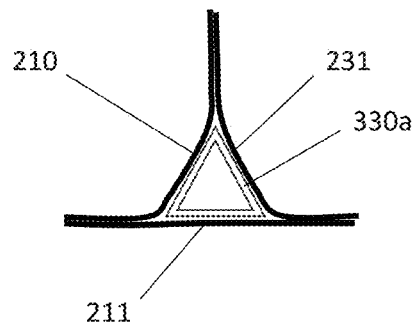
FIGS. 4a, 4b and 4c each show a different example false-work support structure for use in a wing section according to the embodiments.
Figure 4B:
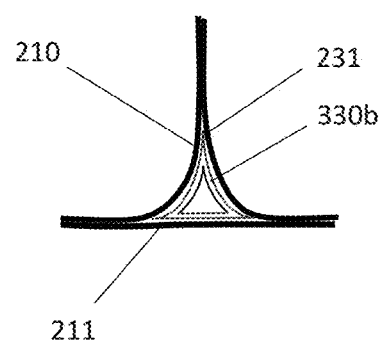

The tubes 230 enable the skin material to turn through large angles (>60°) without locally weakening the composite structure. This principle is illustrated by FIGS. 4a and 4b, which show two different example tubes which could be used as the tube 230. In FIG. 4a a tube 330a is provided between the inner skin 210, the outer skin 211 and the coving skin 231. The profile of the tube 330a comprises a triangle with straight sides. It will be appreciated from FIG. 4a that the tube 330a enables the inner skin 210 and the coving skin 231 to turn through an angle of approximately 90 degrees in a manner such that each individual angle encountered by the skin material is obtuse.

FIG. 4b shows a first alternative triangular-section tube 330b. The profile of the tube 330b has concave sides with a large radius of curvature. The inner skin 210 and the coving skin 231 follow this radius of curvature and are supported by the tube 330b. This enables each of the inner skin 210 and the coving skin 213 to turn through an angle of approximately 90 degrees without creating a sharp corner in the skin material. Avoiding sharp corners in the composite material advantageously prevents corner unfolding issues (through-thickness stresses) such as those associated with conventional CFRP spars.

Figure 4C:
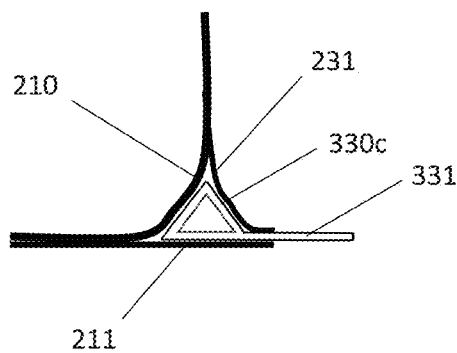

FIG. 4c shows a second alternative triangular-section tube 330c. The tube 330c is the same as the tube 330a of FIG. 4a, except that the tube 330c further comprises a "butt-strap" protrusion extending from one corner of the tube profile. A butt-strap can equally be provided on a tube having a different profile to that of the tube 330a, for example the tube 330b of FIG. 4b. The butt-strap can extend along the whole length of the tube 330c, or alternatively, the tube can be provided with one or more butt-strap sections where the butt-strap is present (each of which is shorter than the tube 330c) and one or more sections where the butt-strap is not present (in these strapless sections the tube profile will be the same as that of the tube 330a). The butt-strap can be an integral feature of the tube 330c. For example, the tube 330c could comprise a titanium-alloy triangular-section tubes with an integral flanges (where the flange provides the butt-strap feature).

When the tube 330c is used in the formation of a trailing edge protrusion, such as the upper protrusion 219 or the lower protrusion 220 of the wing section 20, the butt-strap extends rearwardly by more than the skin sections supported by the tube 330c (e.g. the outer skin 211 and the coving skin 231). Furthermore, the triangular profile shape of the tube 330c provides local torque stiffness to the butt-strap, enabling it to carry out-of-plane aerodynamic loading. The butt-strap therefore provides a surface to which an aerodynamic feature such as a cover panel or flexible shroud can be mounted, e.g. with conventional fasteners. Such fasteners would not go through the skin material, and therefore would not create any local weaknesses in the skin.

Lambda junctions can, in principle, be used to provide mounting points for "false-work" features at any point on a wing section profile. The term "false-work" as used herein is intended to refer to structure that is attached to the primary structure (e.g. to provide a continuous aerodynamic surface) but that is not intended to carry primary loads. This avoids the need to bolt such false-work directly into primary wing structure. The cover panel 232 of FIG. 3b is an example of a false-work feature.

In the example of FIGS. 3a and 3b, two lambda junctions at the trailing edge of the wing section 20 create a "C" shaped trailing-edge wing profile, which advantageously cooperates with the leading edge profile shape of the flap 226. However; it is possible to provide a single lambda junction at the trailing edge, or no lambda junctions at all at the trailing edge (in which case the trailing edge profile of the wing section will be similar to that of the wing section 10 of FIGS. 2a and 2b). Similarly, one or more lambda junctions can be provided at the leading edge 21, e.g. to create a profile shape which cooperates with a slat. FIGS. 5a-5d illustrate various different wing profile shapes that can be created based on lambda junctions.

FIG. 5a is a partial cross-section through a wing section 40a having a C-shaped tail edge profile, comprising an upper trailing edge protrusion 419 and a lower trailing edge protrusion 420. This is the same type of tail-edge profile as is exhibited by the wing section 20 of FIGS. 3a and 3b. The wing section 40a comprises an inner skin 410, an outer skin 411 a coving skin 431, and a triangular-section tube 430 arranged in the manner described above in relation to FIGS. 3a and 3b. The protrusions 419 and 420 can be configured to cooperate with the leading edge profile shape of a flap, so as to minimize the gaps between the trailing edge of the wing section and the top and bottom surfaces of the flap when the flap is retracted. This improves the aerodynamic performance of the wing section. Additionally, the upper protrusion 419 and/or the lower protrusion 420 can incorporate a butt-strap, as described above. Further aerodynamic-enhancing components, such as flexible shrouds or covers, can be mounted to such a butt-strap without compromising the structural integrity of the wing skin.

In some embodiments, one or more external (i.e. external to the main wing section profile shape) trailing edge ribs can be provided in the space between the upper and lower protrusions 419, 420. FIG. 5b shows one such embodiment in which a CFRP rib 450 is co-cured or co-bonded with the coving skin 431. Advantageously, the external rib 450 provides a feature by which other components can be attached to the wing section 40a using conventional fasteners, without such fasteners penetrating the main skin of the wing section. For example, a conventional spoiler, aileron or flap mechanism could be bolted to the external rib 450. Further such external ribs can be provided at intervals along the spanwise length of the trailing edge of the wing section 40a, if required for a given application.

FIG. 5c is a partial cross-section through a wing section 40c having an S-shaped tail edge profile. The S-shaped tail profile is created by providing an upper protrusion 421 (extending rearwardly from a top region of the tail edge of the wing section 40a, but no corresponding protrusion at a lower region of the tail edge. The upper protrusion 421 is formed by providing a triangular section tube 430 between the inner skin 410 and the outer skin 411, and joining the two spanwise edges of the outer skin 411 at the trailing edge side of the tube 430. Unlike with the wing section 40a, no additional coving skin section is required. Advantageously, this can make the wing section 40c easier and/or more cost effective to manufacture than the wing section 40a. However, the lower surface of the wing section is no longer as aerodynamic where the trailing edge of the wing section meets the leading edge of the flap. However, various solutions are envisaged to mitigate the reduction in aerodynamic efficiency. For example, a protrusion could be bonded to the trailing edge of the wing section 40c.

FIG. 5d is a partial cross-section through a wing section 40d having an S-shaped leading edge profile. The S-shaped leading edge (nose) profile is created by providing a lower leading-edge protrusion 422 (extending forwardly from a bottom region of the leading edge of the wing section 40a), but no corresponding protrusion at an upper region of the leading edge. The protrusion 422 is formed by providing a triangular section tube 430 between the inner skin 410 and the outer skin 411 at the leading edge, and joining the two spanwise edges of the outer skin 411 at the leading edge side of the tube 430. The effect of the protrusion 422 is to extend the lower aerodynamic surface of the wing section forwardly to meet (or substantially meet) the lower trailing-edge surface of a retracted slat. Alternatively to forming the protrusion 422 integrally with the skin using the tube 430, in some examples the protrusion 422 can be formed by bonding on discrete lengths of false-work, or by bolting false-work to a forward-extending butt-strap. The protrusion 422 can be configured to cooperate with the profile shape of a slat (e.g. a "tear-drop" shaped slat, as described below), so as to minimize the gap between the leading edge of the wing section and the slat when the slat is retracted. The protrusion can also be configured to support or include features (such as forward facing spigots) which can mate with the retracted slat so as to provide the functionality of conventional slat hold-down ribs. Such features can ensure that the slats deform sympathetically with the wing bending curvature.

There are various ways in which high-lift devices can be mounted on a wing section according to the embodiments. Conventional trailing edge high-lift systems could, for example, be mounted on the wing section 20 by means of one or more trailing edge external ribs (as described above in relation to FIG. 5b), and/or a butt-strap (as described above in relation to FIG. 4c). If conventional spoilers are used, the spoiler support structure and actuation can be housed in a space provided at the trailing edge region, between the wing section trailing edge profile and the flap leading edge profile. For example, on a wing section having a C-shaped trailing edge profile, a space (hereinafter referred to as a trailing edge cavity) to house spoiler support structure and actuation mechanisms can be created between the coving skin and the leading edge of the flap by using a short chord flap. External ribs may be provided in the trailing edge cavity. In some examples power and/or signalling infrastructure for the spoiler mechanisms can be routed along the trailing edge cavity, meaning that the spoiler mechanisms do not need to be adjacent to dry cells. Alternatively, conventional flap, spoiler and/or slat mechanisms could be housed in the dry cells 224, mounted on support structure fixed to or integrated with the ribs 222. A number of openings would need to be provided through the skin to accommodate such conventional high-lift device mechanisms. Some examples therefore use modified mechanisms which minimize the required number of openings into the dry cells 224.

The wing section 20 of FIGS. 3a and 3b comprises a combination of conventional and non-conventional high-lift devices and associated mechanisms. The high-lift devices 225 and 226 and 227 of the wing section 20 of FIGS. 3a and 3b will now be described with reference to FIGS. 6a-d. The flap 226 is mounted on a linear track 510 and linkage 511. The track 510 extends into the interior space of a dry cell 224 through an opening through the skin at the trailing edge of the wing section 20, between the trailing edge false-work features. The track 510 is supported by rollers 512 and is actuated by a rack and pinion in a manner similar to conventional slat tracks, except that the track is straight rather than curved. Rotation of the flap 226 is controlled via a link 513. The link 513 is attached at one end to the body of the flap 226 and at the other end to the track 510. The link 513 is moveable along the track 510, and the position of the link 513 on the track 510 is controllable in the axial track direction by a linearly-acting actuator (e.g. a screw jack, hydraulic jack, linkage, gearing, etc.). The flap actuation mechanisms (or individual elements thereof) are fixedly attached (e.g. using conventional fasteners) to mounting points/features integrally formed with the ribs 22, and/or to intermediate structure provided in the dry cells (such as the intermediate structure described above in relation to FIGS. 3c and 3d). Further rack and pinion mechanisms may be provided along the spanwise length of the flap, depending on the size of the flap. Where a plurality of flap actuation mechanisms are provided, each mechanism may be housed in a different dry cell 224. Alternatively, two or more flap actuation mechanisms can be housed in the same dry cell 224. Furthermore, in some examples the wing section 20 may comprise more than one flap 226. In such cases each flap will be mounted to the wing section 20 by at least one flap actuation mechanism. Providing the flap actuation mechanisms inside the dry cells 224 means that flap track fairings are not required. This is advantageous because flap track fairings increase the weight and drag of a wing.

The slat 225 is similarly mounted on a curved track 514, which is supported by rollers 515. The track 514 extends into the interior space of a dry cell 224 through an opening through the skin at the leading edge of the wing section 20. The slat mechanism is the same as a conventional slat mechanism, except that it is housed within the dry cells 224 instead of in a leading-edge fixed structure. Unlike the flap 226, the slat 225 is not arranged to rotate relative to the track 514. The slat 45 may be mounted on more than one slat track mechanism, depending on the configuration of the slat. If necessary, therefore, the slat 45 may include one or more additional slat actuation mechanism. It is expected that each additional slat actuation mechanism will be housed in a different dry cell 224, but this need not be the case. Furthermore, in some examples the wing section 20 may comprise more than one slat 225. In such cases each slat 225 will be mounted to the wing section 20 by at least one slat actuation mechanism.

The spoilers 227 are of a conventional design, and is actuated by conventional mechanisms (not shown). These mechanisms are mounted to integral mounting features (e.g. one or more external ribs and/or a butt-strap) provided at the trailing edge of the wing section 20, rather than being housed within dry cells.

FIGS. 6*a*-*d* show four different position combinations of the high-lift device 225, 226, 227, corresponding to a cruise configuration, a take-off configuration, a landing configuration, and a deceleration configuration respectively. Airflow around the wing section 20 is indicated by dashed arrows. These Figures illustrate how the flap and slat actuation mechanisms operate within the space of a dry cell 224.

Figure 6A:
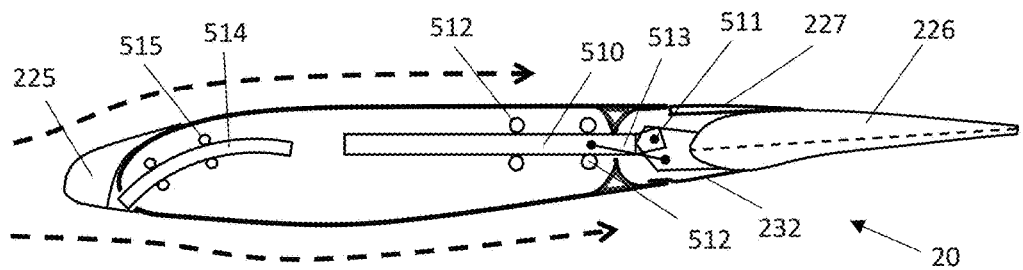

In the cruise configuration, shown in FIG. 6*a*, the slat 226 and the flap 226 are both fully retracted. By virtue of the profile shape of the slat 225 there is no gap between the lower edge of the slat 225 and the lower leading edge of the wing section 20. The gap between the lower trailing edge of the wing section 20 and the lower edge of the flap 226 is sealed by the cover panel 232. This prevents air recirculating in the gaps between the slat and the leading edge of the wing section and between the flap and the trailing edge of the wing section, and thus improves the aerodynamics of the overall wing section profile (i.e. the combined profile of the wing section 20, the slat 225 and the flap 226).

Figure 6B:
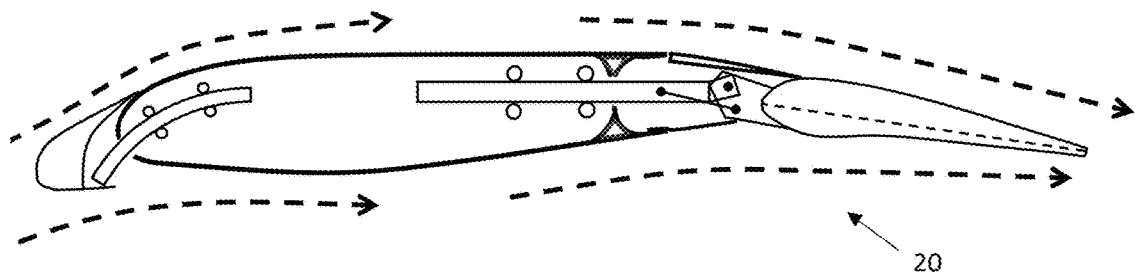

In the take-off configuration, shown in FIG. 6*b*, the slat 225 is partially deployed, and the flap 226 is partially deployed. The spoilers 227 seal the gap between the upper surface of the flap 226 and the trailing edge of the wing section 20. A gap has opened up, due to the rearward movement of the flap from its fully retracted position, between the cover panel 232 and the lower surface of the flap 226. The slat 225 has moved forward and downward, as compared to the fully retracted position (which results in the creation of a non-functional gap between the lower surface of the slat 225 and the lower leading edge of the wing section 20) but there is no gap between the upper surface of the slat 225 and the upper leading edge of the wing section 20.

Figure 6C:
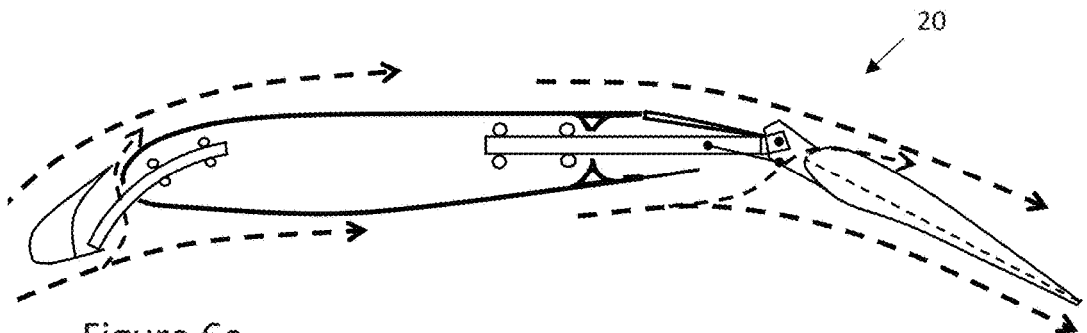

In the landing configuration, shown in FIG. 6*c*, the slat 225 is fully extended forwardly and downwards from the leading edge of the wing section 20, such that a gap (slot) exists between the slat 225 and the leading edge of the wing section 20, allowing air to flow between the slat and the leading edge of the wing section. Similarly, the flap 226 is fully extended rearwardly and downwards from the trailing edge of the wing section 20, to create a gap (slot) between the flap 226 and the trailing edge of the wing section 20. The cover panel 232 is not long enough to seal this gap, meaning that air can flow between the flap 226 and the trailing edge of the wing section 20.

Figure 6D:
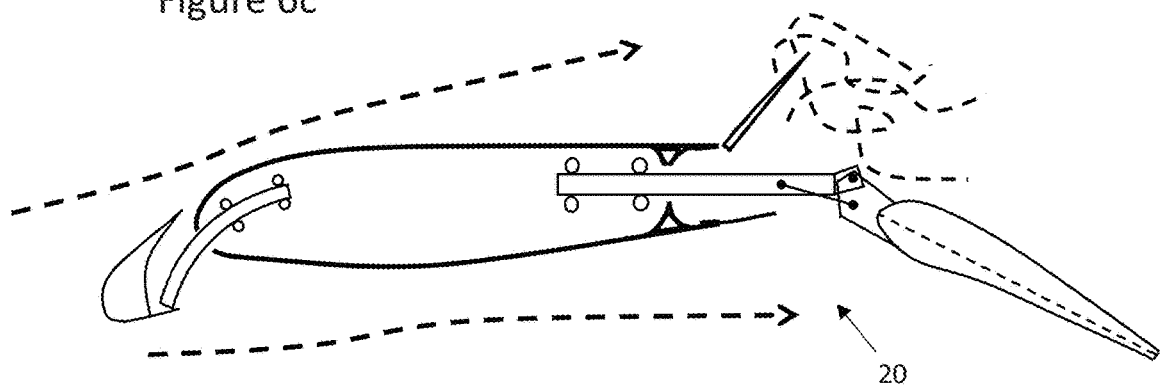

In the deceleration configuration, shown in FIG. 6*d*, the slat 225 and flap 226 are both in the fully extended positions, as described above in relation to FIG. 6*c*. However; in this configuration the spoilers 227 are rotated anti-clockwise by approximately 60° relative to its cruise position. This has the effect of spoiling airflow over the top surface of the wing section 20, to significantly reduce lift and to slow the forward motion of an aircraft on which the wing section 20 is mounted.

FIGS. 7*a*-*d* show a third embodiment in which an alternative combination of high-lift devices are mounted on a wing section 70 having a C-shaped tail profile (like the wing section 20) and an S-shaped nose profile. The structure of the wing section 70 is the same as that of the wing section 20, except for the addition of a leading edge false-work protrusion 722 at the lower leading edge of the wing section 20. The protrusion 722 is constructed in the same manner as the protrusion 422 described above in relation to FIG. 5*d*. Two flexible shrouds 732 and 733 are provided at the trailing edge of the wing section 20, attached to the upper trailing edge protrusion 719 and the lower trailing edge protrusion 722 respectively.

The high-lift devices mounted on the wing section 70 comprise a slat 725 and a flap 726. The wing section 70 does not comprise spoilers. The functionality usually provided by spoilers is instead performed by the slat 725, as will be explained below.

The slat 725 has a "tear-drop" profile shape. This is in contrast to the conventional "hook" shape exhibited by the slat 225 of the wing section 20. A tear-drop slat shape is advantageous because it can create more lift than the hook shape (by increasing the attached airflow) whilst minimising the amount of recirculating air (which creates unwanted noise). The slat 725 is retracted and extended by means of a conventional rack and pinion mechanism, like that used by the slat 225 described above. However; the slat 725 is additionally configured to rotate relative to the track on which it is mounted. Such rotation can be generated, for example, by replacing the conventional drop-link attachment between the slat and track with a 4-bar linkage and pitch actuator.

FIGS. 7*a*-*d* show four different position combinations of the high-lift devices 725 and 726, corresponding to a cruise configuration, a take-off configuration, a landing configuration, and a deceleration configuration respectively. It can be seen from FIGS. 7*a* and 7*b* that, when the slat 725 is fully retracted, the leading edge false-work protrusion 722 acts to seal the gap between the leading edge of the wing section 70 and the slat 725 that would otherwise be created due to the tear-drop profile shape of the slat 725.

Figure 7A:
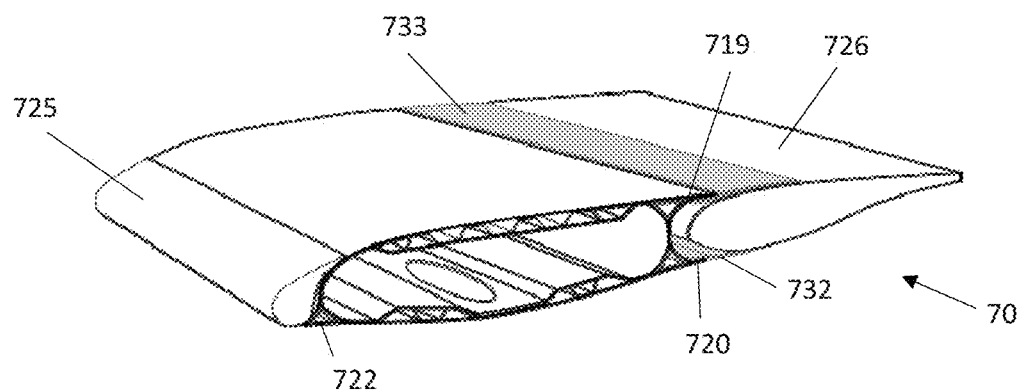
Figure 7B:
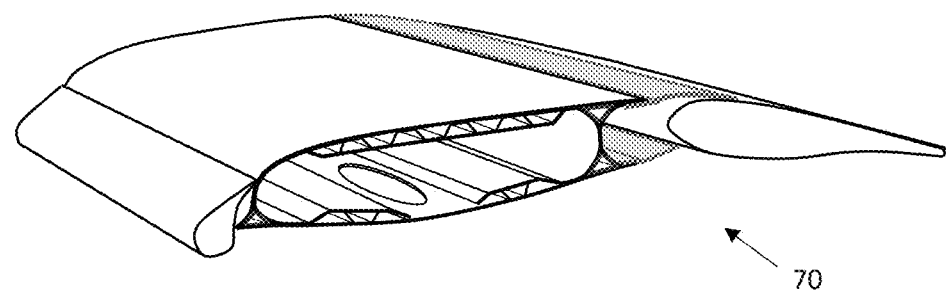
Figure 7C:
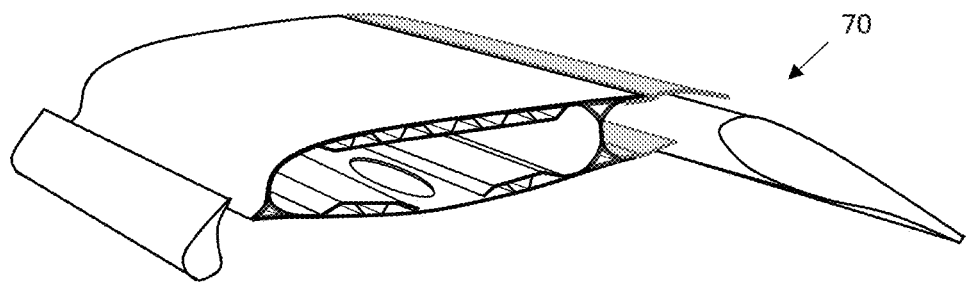

In the take-off and landing configurations, shown by FIGS. 7*b* and 7*c* respectively, the upper flexible shroud 733 seals the gap between the flap 726 and the upper tail edge protrusion 719 (conventionally this function is performed by spoilers, as is the case with the wing section 20).

Figure 7D:
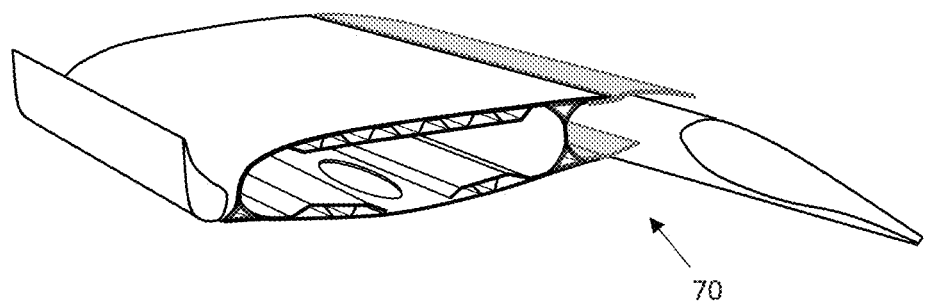

In the deceleration configuration, shown in FIG. 7*d*, the slat 725 is rotated so as to present a large cross-section in the forward direction. In the illustrated example this is achieved by rotating the slat anti-clockwise by approximately 90° relative to its cruise position. This has the effect of spoiling airflow over the top surface of the wing section (conventionally this function is performed by spoilers, as is the case with the wing section 20).

Thus in this embodiment, the aerodynamic effects which are conventionally provided by spoilers are instead provided by the slat 725 and the upper flexible shroud. This allows conventional spoilers to be avoided, meaning that it is not necessary to provide tail edge mounting structures to support such spoilers.

FIGS. 8*a* and 8*b* show an alternative embodiment in which the leading edge 81 of a wing section 80 comprises a cellular structure as described above in relation to the wing sections 10 and 20, whilst the tail edge 82 of the wing section 80 comprises a conventional rear spar 850. The wing section 80 may therefore be considered to have a "semi-cellular" structure. FIG. 8*a* is an internal view of the wing section 80, and FIG. 8*b* is a cross-section through the wing section 80. Unlike with the wing sections 10 and 20 of the previously described embodiments (which may be considered to have "fully cellular" structures), the skin of the wing section 80 does not form a continuous loop. Instead, the two spanwise edges of the skin remain separate at the trailing edge 82, and are each fixed (e.g. using conventional fasteners, the locations of which are indicated by black dots) to the rear spar 850. The ribs (not shown) which divide the internal space of the wing section into wet cells and dry cells are also fixed to the rear spar using conventional fasteners. The rear spar 850 comprises a composite C-beam. A conventional tail-edge fixed structure (not shown) can be fixed to the rear spar 850 and the rear cover panel overhangs using conventional techniques, to support and house conventional tail-edge high lift devices and their associated mechanisms.

As with the fully-cellular structure of the previous embodiments, the skin at the leading edge of the wing section 80 carries a significant part of the spanwise load experienced by the wing section 80 when in use on an aircraft. However, some of the spanwise load is also carried by the rear spar 850. This semi-cellular embodiment may be less preferred than the fully cellular embodiments described above because the use of bolting on the primary wing structure creates local weaknesses and requires the composite skin material to be reinforced. Wing sections according to this embodiment will therefore generally be heavier than wing sections according to previously described embodiments, for a given application.

An example method for manufacturing a wing section according to the embodiments (e.g. the wing section 10 of FIGS. 2*a* and 2*b*, and/or the wing section 20 of FIGS. 3*a* and 3*b*, and/or the wing section 80 of FIGS. 8*a* and 8*b*) will now be described with reference to FIG. 9. In the example method, uncured carbon fibres are laid up on a series of mandrels to form the shape of the wing section structure. The carbon fibres are then then cured in place to form a single coherent structure, and the mandrels are removed. The method can be performed as a "one-shot" manufacturing process, where the term "one-shot" is used to mean that resin is infused throughout the entire wing section structure at once, and that wing section structure is then cured in a single process step. Alternatively, the method can be performed as a semi one-shot process, e.g. by placing pre-cured structural components (such as ribs or pairs thereof) in the mould, which become cured into the structure by the subsequent resin infusion and curing process.

Structure which is cured together is hereinafter referred to as "co-cured". Where pre-cured first structure is bonded to adjacent second un-cured structure by curing the second structure, the connection between the first structure and the second structure is referred to hereinafter as "co-bonded". Where two pre-cured structures are bonded together, the connection between them is referred to hereinafter as "secondary bonded". Co-curing provides the best mechanical properties, followed by co-bonding and then secondary bonding.

In a first step 901, one or more mandrels are provided, the one or more mandrels comprising a plurality of rib portions. The plurality of rib portions may be comprised in the one or more mandrels in various ways. For example, in cases in which the one or more mandrels comprises a plurality of mandrels, one or more of the mandrels may not comprise any rib portions. All of the rib portions may be comprised in a single mandrel. The number of rib portions comprised in a given mandrel may vary across a plurality of mandrels. The rib portions may be distributed, evenly or unevenly, among some or all of a plurality of mandrels.

Where a rib portion is comprised in a given mandrel, at least part of the edge of that rib portion is exposed at the surface of the given mandrel. The one or more mandrels comprises at least one wet cell mandrel and at least one dry cell mandrel. The number of wet cell mandrels is equal to the number of wet cells to be comprised in the completed wing section, and the number of dry cell mandrels is equal to the number of dry cells to be comprised in the completed wing section. In some examples each dry cell mandrel comprises a pair of rib portions, provided on opposite sides of a portion of mandrel material. Each rib portion is oriented such that any integral features of that rib portion (i.e. for facilitating the attachment of mechanisms or structures to the completed wing section) are internal to the dry cell mandrel. The rib portions may have flanges around their edges, which are exposed on the surface of the dry cell mandrel, to facilitate connection of the rib portions to the skin. For dry cells which are to comprise intermediate structure co-cured or co-bonded to the ribs, the dry cell mandrels corresponding to those dry cells will further comprise such intermediate structure. Such intermediate structure can comprise, for example, pre-cured, part-cured or uncured composite material.

For a given dry cell mandrel, the portion of mandrel material is the same shape and size as the space within the dry cell of the completed wing section to which that mandrel corresponds. In such examples each wet cell mandrel comprises a portion of mandrel material and does not comprise any rib portions. For a given wet cell mandrel, the portion of mandrel material is the same shape and size as the space within the wet cell of the completed wing section to which that wet cell mandrel corresponds. In other examples, each wet cell mandrel and dry cell mandrel comprises a single rib portion provided on the side of a portion of mandrel material of equal shape and size to its corresponding cell. The mandrel material is dissolvable or collapsible, so that each mandrel can be removed from the interior of its corresponding cell in the completed wing section through a hole having a largest dimension smaller than the largest dimension of the cell, e.g. a manhole.

Providing the mandrels further comprises arranging the mandrels according to a predefined arrangement, e.g. by supporting each mandrel to abut at least one other mandrel. The predefined arrangement corresponds to the desired arrangement of wet and dry cells in the completed wing section. When the mandrels are arranged according to the predefined arrangement, the outer surface of the combined arrangement of mandrels corresponds to the IML of the completed wing section.

The rib portions may have any of the features of the ribs 112 described above in relation to FIGS. 2a and 2b, or the ribs 222 described above in relation to FIGS. 3a and 3b. In particular, one or more of the rib portions can include integral features to facilitate the mounting of structures/mechanisms to the completed wing section structure. For a true "one-shot" process, the rib portions are uncured during step 901. However; it is also possible to perform this step using pre-cured, or part-cured rib portions. Methods in which pre-cured rib portions are used will hereinafter be referred to as "semi-one-shot" methods.

In a specific example method, illustrated by FIG. 10, step 901 is performed as follows. Each dry cell mandrel 1001 is formed by filling a pre-cured dry cell structure (i.e. a pair of rib portions 1012 and any intermediate structure 1015 therebetween) with a dissolvable mandrel material (e.g. Aquacore™, supplied by Advanced Ceramics Manufacturing (ACM)). The mandrel material is then machined back to form the dry cell mandrel 1001. The rib portions 1012 have flanges 1014 around their edges, which are exposed on the surface of the dry cell mandrel 1001. Sacrificial plies are initially provided on the rib flanges, which are machined off during machining of the mandrel material. A dry cell mandrel 1001 is created for each dry cell which is to be comprised in the completed wing section. Each wet cell mandrel 1002 is formed from dissolvable or collapsible mandrel material, e.g. by means of a removable mould of an appropriate shape. A wet cell mandrel 1002 is created for each wet cell which is to be comprised in the completed wing section. The dry cell mandrels 1001 are then arranged alongside the wet cell mandrels 1002 to form a complete wing mandrel 100.

FIG. 10 is an exploded view of the complete wing mandrel 100 formed from the dry cell mandrels 1001 and the wet cell mandrels 1002. Some of the dry cell mandrels 1001 comprise intermediate structure 1015. The wet cell mandrels 1002 and dry cell mandrels 1001 are alternately arranged so as to create a completed wing section comprising a series of alternating wet cells and dry cells. The shape of the complete wing mandrel 100 corresponds to the IML of the completed wing section. As such, it includes recesses in the upper and lower surfaces, shaped to receive reinforcing structures (e.g. stringer ducts and/or foam core material). The surfaces (i.e. the substantially vertical surfaces) of the tip and root ends of the complete wing mandrel are formed by rib portions 1012.

Referring again to FIG. 9, in step 902, a first portion of uncured skin material is provided on the one or more mandrels. The first portion of uncured skin material is wrapped, partially or completely, around the one or more mandrels. For example, the portion of uncured skin material may be wrapped around a complete wing mandrel which comprises at least one wet cell mandrel and at least one dry cell mandrel, arranged according to a predefined arrangement (e.g. the complete wing mandrel 100 of FIG. 10). It will be appreciated that, since the one or more mandrels comprises a plurality of rib portions, wrapping the first portion of uncured skin material around the one or more mandrels necessarily involves wrapping the first portion of uncured skin material around the plurality of rib portions. When wrapped, the first portion of skin material will contact the exposed edges of the rib portions comprised in the one or more mandrels. The first portion of uncured skin material forms the Inner Mould Line (IML) of the completed wing section. The first portion of skin material may have any of the features of the inner skin 110 described above in relation to FIGS. 2a and 2b and/or the inner skin 210 described above in relation to FIGS. 3a and 3b. The first portion of skin material can comprise, for example, dry carbon fibre held in place with interwoven thermoplastic fibres, or pre-preg CFRP. The first portion of skin material may comprise plies which are interleaved during wrapping around the one or more mandrels to produce a continuous loop of skin material.

If the method is being used to manufacture a wing section having a fully cellular structure (e.g. the wing section 10 of FIGS. 2a and 2b, or the wing section 20 of FIGS. 3a and 3b), the first portion of uncured skin material is wrapped around the one or more mandrels so as to completely encircle the mandrels (and thus the rib portions comprised therein). This advantageously creates a structurally stiff aerodynamic profile without the use of any fasteners.

If the method is being used to manufacture a wing section having a semi-cellular structure (e.g. the wing section 80 of FIGS. 8a and 8b), providing the first portion of uncured skin material on the one or more mandrels comprises providing the first portion of uncured skin material on a first part of the surface of the mandrels, and leaving a second part of the surface of the one or more mandrels free from skin material. The spanwise edges of the first portion of uncured skin material therefore do not abut, overlap or otherwise meet each other. The first part of the surface of the one or more mandrels corresponds to the leading edge of the completed wing section. The first part of the surface may also correspond to substantially all of the upper and lower surfaces of the completed wing section. The second part of the surface of the one or more mandrels corresponds to the trailing edge of the completed wing section.

In step 903, reinforcing structures are provided on the first portion of uncured skin material. The reinforcing structures comprise duct stringers (and, if required, foam core material). Providing the reinforcing structures on the first portion of uncured skin material may comprise, for example, placing the reinforcing structures in contact with the first portion of uncured skin material. The reinforcing structures are arranged on the first portion of uncured skin material according to a predefined arrangement. The predefined arrangement can, for example, be defined such that the reinforcing structures are located as described above in relation to the wing section 10 of FIGS. 2a and 2b. In some examples the reinforcing structures are provided in one or more recesses in the surface of the first portion of uncured skin material (which may be created by, e.g., recesses in the surface of the one or more mandrels). It is possible that a wing structure according to the embodiments could be formed without any reinforcing structures, therefore step 903 is considered to be optional (and is accordingly shown using a dashed line in FIG. 9).

If the completed wing section is to include one or more false-work features (such as a flexible shroud, a fixed cover panel, etc.) and/or external structural features (such as an external rib, a coving skin, etc.) (referred to collectively as "external features"), supporting structures (e.g. one or more triangular-section tubes, etc.) for such external features and/or the external features themselves are also provided on the first portion of uncured skin material. Providing the one or more external features and/or supporting structures on the first portion of uncured skin material may comprise, for example, placing the one or more external features/supporting structures in contact with the first portion of uncured skin material. The external features/supporting structures are arranged on the first portion of uncured skin material according to a predefined arrangement. The predefined arrangement can, for example, be defined such that the external features/supporting structures are located as described above in relation to the wing section 20 of FIGS. 3a-d.

In a specific example method, illustrated by FIG. 11, step 903 is performed as follows. An IML skin 1110 comprising a first portion of uncured skin material wrapped fully around a complete mandrel (e.g. the complete mandrel 100 of FIG. 10), so as to form a closed loop around the complete mandrel, is provided (e.g. as a result of performing step 902). The IML skin 1110 includes several recesses 1111, in particular a recess in the upper surface and a recess in the lower surface. An upper reinforcing structure 1112 comprising a preformed set of duct stringers, and a lower reinforcing structure 1113 comprising a preformed assembly of duct stringers and foam core material, are also provided. The duct stringers can be formed from a dry-fibre composite material, a part-cured composite material, or a pre-cured composite material. The shape of the upper surface recess corresponds to the shape of the lower surface of the upper reinforcing structure 1112, such that the upper reinforcing structure 1112 can be completely received within the upper surface recess. Similarly, the shape of the lower surface recess corresponds to the shape of the upper surface of the lower reinforcing structure 1113, such that the lower reinforcing structure 1113 can be completely received within the lower surface recess. A smooth surface is therefore created by the surface of the IML skin 1110 and the upper and lower reinforcing structures 1112, 113 when the upper and lower reinforcing structures 1112, 113 are provided on the first portion of uncured skin material.

In the specific example, the completed wing section is to have a C-shaped tail profile. Therefore performing step 903 additionally comprises providing upper and lower triangular-section tubes 1114 to the first portion of uncured skin material. The tubes 1114 may have any of the features described above in relation to the tubes 230 described above in relation to FIGS. 3a and 3b, the tubes 330a, 330b and 330c described above in relation to FIGS. 4a-c, and/or the tubes 430 described above in relation to FIGS. 5a-d. The tubes 1114 are provided at the tail edge of the IML skin. The tubes 1114 have hyper-pin features on their surface, which hold them in place on the first portion of uncured skin material during providing of a coving skin and the second portion of uncured skin material. In alternative examples in which the triangular-section tubes comprise integral buttstraps, the butt-straps can be fastened to a coving skin mandrel (or otherwise supported) to hold the tubes in place on the first portion of uncured skin material.

A coving skin 1115 is then provided on the first portion of uncured skin material, at the tail edge of the IML skin, such that the tubes 1114 are between the coving skin 1115 and the first portion of skin material. The coving skin 1115 may have any of the features described above in relation to the coving skin 231 described above in relation to FIGS. 3a and 3b and FIGS. 4a-c, and/or the coving skin 431 described above in relation to FIG. 5a. The coving skin 1115 is uncured, and is supported on a separate coving mandrel 1116. The material of the coving skin 1115 is the same as the material of the first portion of uncured skin material.

Referring again to FIG. 9, in step 904 a second portion of uncured skin material is provided on the first portion of uncured skin material and the reinforcing structures (and, if present, the external features/support structures). The second portion of uncured skin material is wrapped, partially or completely, around the first portion of uncured skin material and reinforcing structures. When wrapped, the second portion of uncured skin material will contact (at least part of) the outer surface of the first portion of skin material, the outer surfaces of the reinforcing structures, and any external features/structures which are present. The reinforcing structures are thereby sandwiched between the first portion of uncured skin material and the second portion of uncured skin material. In some examples, any external features/structures are provided in contact with both of the first and second portions of uncured skin material. However; it is possible for external features/structures to be provided which contact only one of the first and second portions of uncured skin material (e.g. because these external features/structures additionally contact a coving skin). It is possible that a wing structure according to the embodiments could be formed using only a first portion of uncured skin material, therefore step 904 is considered to be optional.

The second portion of uncured skin material forms the Outer Mould Line (OML), and therefore the aerodynamic profile shape, of the completed wing section. The second portion of skin material may have any of the features of the outer skin 111 described above in relation to FIGS. 2a and 2b and/or the outer skin 211 described above in relation to FIGS. 3a and 3b. The second portion of skin material can comprise, for example, dry carbon fibre held in place with interwoven thermoplastic fibres, or pre-preg CFRP. The second portion of uncured skin material may comprise the same material as the first portion of uncured skin material.

In some examples (e.g. examples of fully cellular wing sections which have no trailing edge external features, or which have an S-shaped trailing edge profile) the second portion of uncured skin material is wrapped around the first portion of uncured skin material and reinforcing structures (and, if present, external features/structures) so as to completely encircle the first portion of uncured skin material and reinforcing structures (and, if present, external features/structures). In such examples the plies of the second portion of skin material may be interleaved to produce a continuous loop of skin material.

In other examples (e.g. examples of semi-cellular wing sections, or fully-cellular wing sections which comprise a coving skin) providing the second portion of uncured skin material on first portion of uncured skin material and reinforcing structures (and, if present, external features/structures) comprises providing the second portion of uncured skin material such that the second portion of uncured skin material comprises two spanwise edges which do not meet each other. The second portion of uncured skin material may, e.g., be provided on a first part of the surface of the first portion of uncured skin material, and not on a second part of the surface of the first portion of uncured skin material. The first part of the surface of the first portion of uncured skin material corresponds to the leading edge of the completed wing section. The first part of the surface may also correspond to substantially all of the upper and lower surfaces of the completed wing section. The second part of the surface of the first portion of uncured skin material corresponds will be located at the trailing edge of the completed wing section.

Then, in step 905, the first portion (and, if present, the second portion) of uncured skin material are cured. The rib portions (and any coving skin present), if not pre-cured, are cured simultaneously with the first and second portions of skin material. In some examples performing step 905 comprises vacuum bagging the complete wing section assembly (i.e. which comprises the one or more mandrels, the first and second portions of skin material, the reinforcing structures, and any external features/structures present). Alternatively, to vacuum bagging, the complete wing section assembly can be placed inside matched tooling. A resin transfer moulding (RTM) technique is then used to wet the complete wing section assembly with resin. The complete wing section assembly is then cured, using either an auto-clave or out-of-autoclave process, to form a single coherent structure. Portions of uncured skin material which are in contact will become joined by this process, creating a unitary structure. Any pre-cured composite components will become co-bonded to the unitary structure. Components which do not comprise composite material (e.g. metal external feature supporting structures) can become securely integrated with the composite materials during curing by means of surface formations such as hyper-pins.

In step 906 the mandrel material is removed. This can be achieved, for example, by cutting a hole through the skin, into the interior of each wet cell and each dry cell. In some examples the location of such holes corresponds to the locations of manholes in the completed wing section. Where a dissolvable mandrel material has been used, a solvent is introduced through a hole. When the dissolvable mandrel material has dissolved, the resulting solution is removed through that hole. Where a collapsible mandrel material has been used, collapse of the mandrel material is be initiated (e.g. by accessing the mandrel material via a hole) and the collapsed mandrel material is removed through a hole. After the mandrel material has been removed, the holes may be machined into the form of manholes and/or openings for high-lift mechanisms.

In a further, optional, step 907, the wing section structure is provided with one or more additional features. Such additional features can comprise, for example, one or more of: an opening into a duct stringer from a wet cell; an opening into a duct stringer from a dry cell; an opening into a dry cell for a high-lift device mechanism; a manhole, support structure for a high-lift device; support structure for an engine pylon; support structure for a flight-control device; support structure for an external range extension fuel tank; support structure for landing gear; fuselage attachment structure, etc. Such additional features can be provided using any suitable techniques known in the art. Where access into a wet cell or a dry cell is required for the provision of an additional feature, this can be achieved via a manhole (if already present) or via a hole used for mandrel removal.

Referring to FIG. 13, there is shown a schematic side view of an example of a vehicle according to an embodiment. In the example of FIG. 13, the vehicle is an aircraft 1300. The aircraft 1300 may comprise a wing section 1301. The wing section 1301 comprises: a plurality of ribs; and a skin fixedly attached to the plurality of ribs. The leading edge of the wing section 1301 comprises a series of adjacent cells, each cell comprising an enclosed volume defined by the skin and a pair of the ribs. A dry cell of the series of adjacent cells comprises a mounting point on at least one of the ribs defining the dry cell, for mounting a leading edge high-lift device support apparatus in the dry cell. The wing section 1301 is configured such that substantially all of the spanwise load on the wing section, when in use on the aircraft 1300, is carried by the skin. The wing section 1301 may have any or all of the features of the wing section 10 described with reference to FIGS. 2a and 2b, the wing section 20 described with reference to FIGS. 3a and 3b, or the wing section 80 described with reference to FIGS. 8a and 8b. The aircraft 1300 may comprise a further wing section 1302, on the opposite side of the fuselage of the aircraft to the wing section 1301. The wing section 1302 may be substantially a mirror image of the wing section 1301.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A main wing section of an aircraft wing comprising:
ribs oriented in a chordwise direction of the aircraft wing;
a skin fixedly attached to the ribs and including an upper wing skin, a lower wing surface, and a leading edge formed where the upper wing skin and lower wing skin come together;
wet cells each within an enclosed volume defined, at least in part, by adjacent ones of the ribs, the upper wing surface, the lower wing surface and the leading edge, each of the wet cells is or contains a fuel tank having a front side adjacent the leading edge;
a first dry cell within a first enclosed volume defined, at least in part, by a first pair of adjacent ones of the ribs, the upper wing surface, the lower wing surface, and the leading edge, and the first dry cell is between adjacent ones of the wet cells and does not include or form a fuel tank;
a first intercostal spar between the first pair of the ribs, wherein a first end of the first intercostal spar is fixed to a first rib of the first pair and an second end of the first intercostal spar is fixed to a second rib of the first pair;
a first mounting point in the first dry cell and attached to the first intercostal spar, wherein the first mounting point is configured to support a first support apparatus for a device external to and forward of the leading edge;
a second dry cell within a second enclosed volume defined, at least in part, by a second pair of adjacent ones of the ribs, the upper wing surface, the lower wing surface, and the leading edge, and the second dry cell is between adjacent ones of the wet cells and does not include or form a fuel tank and the second dry cell is separated from the first dry cell by at least one of the wet cells;
a second intercostal spar between the second pair of the ribs, wherein a first end of the second intercostal spar is fixed to a first rib of the second pair and an second end of the second intercostal spar is fixed to a second rib of the second pair; and a second mounting point in the second dry cell and attached to the second intercostal spar, wherein the second mounting point is configured to support a second support apparatus for the device external of the leading edge.

2. The main wing section according to claim 1, wherein the first and second intercostal spars are front intercostal spars, and the first and second support apparatuses are each a leading edge high-lift device support apparatus extending from a respective one of the first or second mounting point through a respective opening in the leading edge of the skin to the device.

3. The main wing section according to claim 1, wherein the first and second intercostal spars are part height intercostal spars.

4. The main wing section according to claim 1, wherein the first and second mounting points each include an intermediate rib having an end fixed to a respective one of the first and second intercostal spars and extending from the respective one of the first and second intercostal spar in the chordwise direction.

5. The main wing section according to claim 1, wherein the first and second intercostal spars are each a full height spar and at least one of an upper and lower edge of the full height intercostal spar abuts a stringer on the inside surface of the skin.

6. The main wing section according to claim 1, further comprising a wet conduit extending through a plurality of the dry cells, wherein the wet conduit is coupled to a plurality of the fuel tanks in the wet cells and is configured to transport fuel from one of the wet cells to another one of the wet cells.

7. The main wing section according to claim 6, wherein the wet conduit is included in a stringer attached to an inside surface of the skin.

8. The main wing section according to claim 1, wherein at least one of the dry cells includes an additional mounting point configured to mount at least one of:
 a trailing edge high-lift support apparatus;
 an engine pylon support apparatus;
 a wing section-tip device support apparatus; and
 a landing gear support apparatus.

9. The main wing section according to claim 1, wherein at least one of the dry cells includes:
 a second mounting point;
 a trailing edge high-lift device support apparatus mounted to the second mounting point, and
 an opening in the skin at the dry cell, wherein the trailing edge high-lift device support apparatus extends through the opening and is configured to support a trailing edge high-lift device external to the dry cell.

10. The main wing section according to claim 9, wherein the trailing edge high-lift device comprises a flap and the trailing edge high-lift device support apparatus comprises a beam with a rack and pinion.

11. The main wing section according to claim 9, wherein the at least one of the dry cells further includes a rear intercostal spar having ends each affixed to the ribs on opposite sides of the at least one dry cell, and the second mounting point is mounted to the rear intercostal spar.

12. The main wing section according to claim 1, wherein the at least one support apparatus includes a leading edge high-lift device support apparatus, and the wing section further comprising an opening in the skin adjacent the dry cell through which extends the leading edge high-lift device support apparatus.

13. The main wing section according to claim 12, further comprising a leading edge high-lift device forward of the leading edge and mounted to the leading edge high-lift device support apparatus.

14. The main wing section according to claim 1, wherein the skin forms a closed loop extending in a spanwise direction around the ribs.

15. An aircraft main wing section including:
 a skin forming a leading edge, an upper wing surface extending rearward from the leading edge in a chordwise direction of the aircraft wing section, and a lower wing surface extending rearward in the chordwise direction from the leading edge, wherein the leading edge is wherein the upper wing surface and lower wing surface come together;
 ribs extending between the upper and lower wing surfaces and extending to the leading edge, wherein the ribs are oriented in the chordwise direction;
 wet cells each adjacent the leading edge between the upper wing surface, the lower wing surface, the leading edge and a pair of the ribs, and each of the wet cells is or contains a fuel tank;
 dry cells each between the upper wing surface, the lower wing surface and between a pair of the ribs, wherein each of the dry cells extends to the leading edge and is between adjacent ones of the wet cells and a first dry cell of the dry cells is separated by a second dry cell of the dry cells by at least one of the wet cells; wherein each of the dry cells includes an intercostal spar spanning the dry cell and ends of each of the intercostal spars are each fixed to one of the ribs on opposite sides of the dry cell;
 mounting points on each of the intercostal spars, wherein each of the mounting points is configured to receive a support apparatus which supports a device forward of the leading edge, and
 a wet conduit fluidically coupled to at least two of the wet cells and extending through at least one of the dry cells.

16. The aircraft main wing section of claim 15, wherein each of the wet cells lacks a front spar.

17. The aircraft main wing section of claim 15, wherein each of the dry cells lacks a fuel tank.

18. The aircraft main wing section of claim 15, wherein the leading edge is configured to form a load path for at least some of a spanwise load applied to the aircraft wing section.

19. The aircraft main wing section according to claim 15, wherein at least one the dry cells comprises:
 a second intercostal spar within the at least one dry cell and extending between the ribs on opposite sides of the at least one dry cell;
 at least one second mounting point attached to the second intercostal spar; and
 a trailing edge high-lift device support apparatus mounted to the at least one second mounting point and extending through an opening in the skin and configured to support a trailing edge high-lift device external to aircraft wing section.

* * * * *